(12) United States Patent
Vaidya et al.

(10) Patent No.: US 9,693,205 B2
(45) Date of Patent: Jun. 27, 2017

(54) SYSTEM AND METHOD FOR PROVIDING MESSAGE DELIVERY AND PAGING TO A GROUP OF USERS IN A NETWORK ENVIRONMENT

(71) Applicant: CISCO TECHNOLOGY, INC., San Jose, CA (US)

(72) Inventors: Maulik Vijay Vaidya, Atlanta, GA (US); Nirav Salot, Pune (IN); James Paul Seymour, North Aurora, IL (US); Ravi Shankar Chamarty, Natick, MA (US); Vivek Jha, Bangalore (IN); Sebastian Speicher, Wallisellen (CH); Sridhar Bhaskaran, Coimbatore (IN); Rahul Vaidya, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 287 days.

(21) Appl. No.: 14/534,792

(22) Filed: Nov. 6, 2014

(65) Prior Publication Data
US 2016/0007170 A1   Jan. 7, 2016

Related U.S. Application Data

(60) Provisional application No. 62/020,799, filed on Jul. 3, 2014.

(51) Int. Cl.
*H04H 20/71* (2008.01)
*H04W 4/08* (2009.01)
(Continued)

(52) U.S. Cl.
CPC ............ *H04W 4/08* (2013.01); *H04W 4/005* (2013.01); *H04W 4/06* (2013.01); *H04W 4/12* (2013.01);
(Continued)

(58) Field of Classification Search
CPC .................................................. H04W 72/005
(Continued)

(56) References Cited

U.S. PATENT DOCUMENTS 6,483,820 B1   11/2002  Davidson et al.
7,379,739 B2    5/2008  Rajkotia et al.
(Continued)

FOREIGN PATENT DOCUMENTS

CN   102378288       3/2012
CN   105050072 A    11/2015
(Continued)

OTHER PUBLICATIONS

EPO Feb. 8, 2016 Extended Search Report and Written Opinion from European Application Serial No. 15183583.2; 9 pages.
(Continued)

*Primary Examiner* — Christopher R Crompton
(74) *Attorney, Agent, or Firm* — Patent Capital Group

(57) ABSTRACT

An example method is provided in one example embodiment and may include configuring paging parameters for a group of one or more user equipment (UE) based, at least in part, on a group identifier (ID) for the group of one or more UE; communicating the paging parameters to each of the one or more UE of the group; and paging one or more idle mode UE of the group according to the paging parameters to transition the idle mode UE to a connected mode for receiving a group message. In some instances, configuring the paging parameters can include configuring a paging frame and paging occasion for the group of one or more UE based on the group ID; configuring extended paging cycle radio frames for the group of one or more UE; and/or configuring a paging group Radio Network Temporary Identifier for the group of one or more UE.

19 Claims, 14 Drawing Sheets

(51) Int. Cl.
*H04W 4/12* (2009.01)
*H04W 4/00* (2009.01)
*H04W 4/06* (2009.01)
*H04W 64/00* (2009.01)
*H04L 12/761* (2013.01)
*H04W 28/18* (2009.01)

(52) U.S. Cl.
CPC ........... *H04W 64/003* (2013.01); *H04L 45/16* (2013.01); *H04W 28/18* (2013.01)

(58) Field of Classification Search
USPC ........................................................ 370/312
See application file for complete search history.

(56) References Cited

U.S. PATENT DOCUMENTS

| | | |
|---|---|---|
| 7,417,971 B2 | 8/2008 | Jeong et al. |
| 7,983,667 B2 | 7/2011 | Hart et al. |
| 8,107,950 B2 | 1/2012 | Amerijoo et al. |
| 8,320,965 B2 | 11/2012 | Kwun |
| 8,340,711 B1 | 12/2012 | Glass et al. |
| 8,588,698 B2 | 11/2013 | Brisebois |
| 8,611,299 B2 | 12/2013 | Yang et al. |
| 8,639,243 B2 | 1/2014 | Radulescu et al. |
| 8,712,459 B2 | 4/2014 | Lim et al. |
| 8,792,886 B2 | 7/2014 | Meshkati |
| 8,830,936 B2 | 9/2014 | Ren |
| 8,917,658 B2 | 12/2014 | Bjork |
| 9,219,816 B2 | 12/2015 | Grayson et al. |
| 9,226,255 B2 | 12/2015 | Grayson et al. |
| 9,350,737 B2 | 5/2016 | Fernandez Alonso |
| 2005/0036462 A1 | 2/2005 | Sillasto et al. |
| 2007/0008885 A1 | 1/2007 | Bonner |
| 2009/0137246 A1 | 5/2009 | Xing |
| 2009/0305684 A1 | 12/2009 | Jones |
| 2010/0112982 A1 | 5/2010 | Singh et al. |
| 2010/0124929 A1 | 5/2010 | Lee |
| 2010/0135237 A1 | 6/2010 | Papasakellariou |
| 2010/0157922 A1 | 6/2010 | Kim et al. |
| 2010/0182955 A1 | 7/2010 | Bjork |
| 2010/0260036 A1 | 10/2010 | Molnar et al. |
| 2010/0260068 A1 | 10/2010 | Bhatt et al. |
| 2010/0279628 A1 | 11/2010 | Love et al. |
| 2011/0110316 A1 | 5/2011 | Chen et al. |
| 2011/0128913 A1 | 6/2011 | Chowdhury |
| 2011/0130144 A1 | 6/2011 | Schein |
| 2011/0170481 A1 | 7/2011 | Gomes |
| 2011/0177817 A1 | 7/2011 | Hole |
| 2011/0201333 A1 | 8/2011 | Kwon |
| 2011/0237283 A1 | 9/2011 | Shan et al. |
| 2011/0267967 A1 | 11/2011 | Ratasuk |
| 2011/0314178 A1 | 12/2011 | Kanode |
| 2012/0004003 A1 | 1/2012 | Shaheen et al. |
| 2012/0015653 A1 | 1/2012 | Paliwal |
| 2012/0100849 A1 | 4/2012 | Marsico |
| 2012/0106423 A1 | 5/2012 | Nylander |
| 2012/0115454 A1 | 5/2012 | Liao |
| 2012/0191842 A1 | 7/2012 | Hu et al. |
| 2012/0210003 A1 | 8/2012 | Castro |
| 2012/0258720 A1 | 10/2012 | Tinnakornsrisphap et al. |
| 2012/0260299 A1 | 10/2012 | Kotecha |
| 2012/0265888 A1 | 10/2012 | Roeland et al. |
| 2012/0269167 A1 | 10/2012 | Velev |
| 2012/0276913 A1 | 11/2012 | Lim |
| 2012/0290452 A1 | 11/2012 | Pancorbo Marcos |
| 2012/0327850 A1 | 12/2012 | Wang et al. |
| 2013/0003697 A1 | 1/2013 | Adjakple et al. |
| 2013/0028097 A1 | 1/2013 | Barrett |
| 2013/0077482 A1 | 3/2013 | Krishna et al. |
| 2013/0114484 A1* | 5/2013 | Suzuki ................ H04W 68/025 370/311 |
| 2013/0132570 A1 | 5/2013 | Lopez Nieto |
| 2013/0136072 A1 | 5/2013 | Bachmann et al. |
| 2013/0139221 A1 | 5/2013 | Gundavelli |
| 2013/0155948 A1 | 6/2013 | Pinheiro |
| 2013/0155954 A1 | 6/2013 | Wang et al. |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0235759 A1 | 9/2013 | Meshkati |
| 2013/0258890 A1 | 10/2013 | Li et al. |
| 2013/0294356 A1 | 11/2013 | Bala et al. |
| 2013/0308531 A1 | 11/2013 | So et al. |
| 2013/0326001 A1 | 12/2013 | Jorgensen et al. |
| 2013/0337769 A1 | 12/2013 | Bhatia |
| 2013/0337821 A1 | 12/2013 | Clegg |
| 2013/0339783 A1 | 12/2013 | Fernandez Alonso et al. |
| 2013/0343288 A1 | 12/2013 | Ratasuk et al. |
| 2013/0343304 A1 | 12/2013 | Kaippallimalil et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0016614 A1 | 1/2014 | Velev |
| 2014/0016629 A1 | 1/2014 | Pancorbo Marcos |
| 2014/0078986 A1 | 3/2014 | Kaippallimalil et al. |
| 2014/0086226 A1 | 3/2014 | Zhao et al. |
| 2014/0094139 A1 | 4/2014 | Xu |
| 2014/0105028 A1 | 4/2014 | Bhaskaran |
| 2014/0112251 A1 | 4/2014 | Kim et al. |
| 2014/0126453 A1 | 5/2014 | Park |
| 2014/0146732 A1 | 5/2014 | Olufunmilola et al. |
| 2014/0155109 A1 | 6/2014 | Vaidya et al. |
| 2014/0177583 A1 | 6/2014 | Aso |
| 2014/0185537 A1 | 7/2014 | Papasakellariou |
| 2014/0235226 A1 | 8/2014 | Pinheiro et al. |
| 2014/0241316 A1 | 8/2014 | Okmyanskiy et al. |
| 2014/0254367 A1 | 9/2014 | Jeong |
| 2014/0287759 A1 | 9/2014 | Purohit |
| 2014/0287769 A1 | 9/2014 | Taori |
| 2014/0297888 A1 | 10/2014 | McCann |
| 2014/0301351 A1 | 10/2014 | Gao |
| 2014/0307589 A1 | 10/2014 | Li |
| 2014/0321328 A1 | 10/2014 | Zuniga |
| 2014/0321365 A1 | 10/2014 | Shoji |
| 2014/0328266 A1 | 11/2014 | Yu |
| 2014/0342745 A1 | 11/2014 | Bhushan |
| 2014/0378131 A1 | 12/2014 | Rui |
| 2015/0009826 A1 | 1/2015 | Ma |
| 2015/0044989 A1 | 2/2015 | De Foy |
| 2015/0055588 A1 | 2/2015 | Yerramalli et al. |
| 2015/0063101 A1 | 3/2015 | Touati |
| 2015/0103768 A1* | 4/2015 | Chen ................... H04W 68/025 370/329 |
| 2015/0103772 A1 | 4/2015 | Carnero Ros |
| 2015/0117347 A1 | 4/2015 | Iwai |
| 2015/0146594 A1 | 5/2015 | Grayson |
| 2015/0172471 A1 | 6/2015 | Castro |
| 2015/0181577 A1 | 6/2015 | Moulsley |
| 2015/0200760 A1 | 7/2015 | Xia |
| 2015/0208403 A1 | 7/2015 | Takeda |
| 2015/0222634 A1 | 8/2015 | Ludwig |
| 2015/0245241 A1 | 8/2015 | Posz |
| 2015/0264652 A1 | 9/2015 | Zhang |
| 2015/0296516 A1 | 10/2015 | Jung |
| 2015/0365931 A1 | 12/2015 | Ng et al. |
| 2015/0382386 A1 | 12/2015 | Castro Castro |
| 2016/0007316 A1 | 1/2016 | Vaidya et al. |
| 2016/0007378 A1 | 1/2016 | Bertorelle |
| 2016/0037490 A1 | 2/2016 | Pazhyannur et al. |
| 2016/0037550 A1 | 2/2016 | Barabell |
| 2016/0073282 A1 | 3/2016 | Speicher |
| 2016/0073283 A1 | 3/2016 | Grayson et al. |
| 2016/0073285 A1 | 3/2016 | Graham et al. |
| 2016/0073328 A1 | 3/2016 | Li |
| 2016/0094976 A1 | 3/2016 | Enomoto |
| 2016/0099794 A1 | 4/2016 | Chendamari |
| 2016/0105882 A1 | 4/2016 | Park |
| 2016/0127137 A1 | 5/2016 | Fernandez Alonso |
| 2016/0134761 A1 | 5/2016 | Campbell et al. |
| 2016/0135143 A1 | 5/2016 | Won et al. |
| 2016/0156729 A1 | 6/2016 | Essigmann |
| 2016/0165494 A1 | 6/2016 | Warburton et al. |

(56) References Cited

U.S. PATENT DOCUMENTS

| | | | |
|---|---|---|---|
| 2016/0191631 | A1 | 6/2016 | Haraszti |
| 2016/0226669 | A1 | 8/2016 | Livanos et al. |
| 2016/0227428 | A1 | 8/2016 | Novlan et al. |
| 2016/0234706 | A1 | 8/2016 | Liu et al. |
| 2016/0234763 | A1 | 8/2016 | Um et al. |
| 2016/0242203 | A1 | 8/2016 | You |
| 2016/0262041 | A1* | 9/2016 | Ronneke ........... H04W 52/0216 |
| 2016/0295357 | A1 | 10/2016 | Grayson et al. |
| 2016/0295521 | A1 | 10/2016 | Grayson et al. |

FOREIGN PATENT DOCUMENTS

| | | |
|---|---|---|
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |
| EP | 2757850 | 7/2014 |
| EP | 2981119 | 2/2016 |
| EP | 2993868 | 3/2016 |
| EP | 2996386 | 3/2016 |
| EP | 3018946 | 5/2016 |
| EP | 3029988 | 6/2016 |
| EP | 3046386 | 7/2016 |
| WO | WO2009/025601 | 2/2009 |
| WO | WO2011/002958 | 1/2011 |
| WO | WO2011/085238 | 7/2011 |
| WO | WO2011/134529 | 11/2011 |
| WO | WO2011/154761 | 12/2011 |
| WO | WO2012/055984 | 5/2012 |
| WO | WO2012/135121 | 10/2012 |
| WO | WO2013/041574 | 3/2013 |
| WO | WO2013/082245 | 6/2013 |
| WO | WO2013/086659 | 6/2013 |
| WO | WO2013/119021 | 8/2013 |
| WO | WO2013/169991 | 11/2013 |
| WO | WO2014/005452 | 1/2014 |
| WO | WO2014/051606 | 4/2014 |
| WO | WO2014/177208 | 11/2014 |
| WO | WO2016/126413 | 8/2016 |
| WO | WO2016/126414 | 8/2016 |

OTHER PUBLICATIONS

3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.

3GPP TSG-RAN3 Meeting #69 R3-102094, "Text Proposal for HNBRAP," Alcatel-Lucent, 3GPP Draft, Madrid, Spain, Aug. 23-27, 2010; 62 pages.

"3GPP TR 23.852 (V12.0.0 (Sep. 2013) Technical Report: 3$^{rd}$ Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3$^{rd}$ Generation Partnership Project (3GPP), Sep. 2013, 157 pages.

Drome, R., "Dynamic Host Configuration Protocol," Network Working Group RFC 2131, Mar. 1997; 45 pages.

Leung, K., et al., "WiMAX Forum/3GPP2 Proxy Mobile IPv4," Independent Submission RFC 5563, Feb. 2010; 41 pages.

Narten, T., et al., "Neighbor Discovery for IP version 6 (IPv6)," Network Working Group RFC 4861, Sep. 2007; 97 pages.

Adrangi, F., et al., "Chargeable User Identity," Network Working Group RFC 4372, Jan. 2006, 10 pages.

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"Paging Channel Selection," UMTS World; first published on or about Jun. 22, 2003; 3 pages http://www.umtsworld.com/technology/paging.html.

Holbrook, H., et al., "Source-Specific-Multicast for IP," Network Working Group RFC 4607, Aug. 2006.

Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.

"PDCCH Processing," published by Gio Zakradze on Dec. 29, 2014; 56 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex-France, Sep. 2014.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.

"3GPP TS 29-272 V12-6-0 (Sep. 2014) Technical Specification: 3rd Generation Partnership Project; Technical Specification Group Core Network and Terminals; Evolved Packet System (EPS); Mobility

(56) References Cited

OTHER PUBLICATIONS

Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"PDCCH Construction, Expert Opinion," posted by Hongyan on May 20, 2011; LTE University, 4 pages; http://lteuniversity.com/get_trained/expert_opinion1/b/hongyanlei/archive/2011/05/20/pdcch-construction.aspx.

"GSMA LTE Roaming Guidelines, Version 9.0," GSM Association, Official Document IR88, Jan. 24, 2013; 53 pages.

Guttman, E., et al., "Service Location Protocol, Version 2," Network Working Group RFC 2608, Jun. 1999, 57 pages.

"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project; Sep. 2014.

"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

3GPP TSG-RAN WG3 #61bis, R3-081174, "Solution for interference reduction SON use case," Orange, Alcatel-Lucent, Agenda Item 10.1.1c; Kansas City, MO, USA; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex-France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.

"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (3GPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.

(56) References Cited

OTHER PUBLICATIONS

"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"Broadband Forum Technical Report: TR-196 Femto Access Point Service Data Model," Issue: 1, Issue Date: Apr. 2009, © The Broadband Forum; 131 pages.
Broadband Forum, "TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.
Broadband Forum, "TR-196 Femto Access Point Service Data Model," Broadband Forum Technical Report, Issue 2, Issue Date: Nov. 2011, © The Broadband Forum. All Rights Reserved; 46 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Extensible Authentication Protocol," Wikipedia, the free encyclopedia, Sep. 16, 2013, 10 pages http://en.wikipedia.org/wiki/Extensible_Authentication_Protocol#EAP-FAST.
"Link Layer Discovery Protocol," Wikipedia, the free encyclopedia, Sep. 25, 2013, 4 pages, http://en.wikipedia.org/wiki/Link_Layer_Discovery_Protocol.
"Radius," Wikipedia, the free encyclopedia, Sep. 26, 2013, 12 pages http://en.wikipedia.org/wiki/RADIUS.
Ashraf, Imran, "Distributed Radio Coverage Optimization in Enterprise Femtocell Networks," International Conference on Communications ICC 2010, May 23-27, 2010, Cape Town, South Africa; 6 pages.
Calhoun, P., "Diameter Base Protocol," Network Working Group RFC 3588, Sep. 2003; 147 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages Saad, Sawsan A., et al., "A Survey on Power Control Techniques in Femtocell Networks," Journal of Communications vol. 8, No. 12, Dec. 2013; 10 pages.
EPO Dec. 15, 2015 Extended Search Report and Written Opinion from European Application Serial No. 15178914.6.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
Almeida, Erika, et al., "Enabling LTE/Wifi Coexistence by LTE Blank Subframe Allocation," 2013 IEEE International Conference on Communications (ICC), Jun. 9, 2013, pp. 5083-5088.
"LTE Quick Reference: CCE Index Calculation," LTE Handbook, Share Technote, http://www.sharetechnote.com/html/Handbook_LTE_CCE+Index.html First published on or about Jul. 8, 2012.
EPO Jan. 29, 2016 Extended Search Report and Written Opinion from European Application Serial No. 15180616.
Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.
"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.
SA-WG2 Meeting #92, S2-123194 (Revision of Sw-122735), Juniper Networks, Barcelona, Spain, Jul. 9-13, 2012; 13 pages.
EPO Mar. 11, 2016 Extended Search Report and Written Opinion from European Application Serial No. 15193713.
"3GPP TS 23.203 V7.3.0 (Jun. 1, 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.
PCT Apr. 6, 2016 International Search Report and Written Opinion of the International Searching Authority from International Application No. PCT/US2016/013931.
"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.
PCT Apr. 6, 2016 International Search Report and Written Opinion of the International Searching Authority from International Application No. PCT/US2016/013934.
3GPP TSG-CT WG3 Meeting #80, C3-150092, 29.213 CR0593, 3GPP Draft; Current Version 13.0.0; Huawei, et al.; Sorrento, Italy Feb. 2-6, 2015.
EPO Apr. 28, 2016 Extended Search Report and Written Opinion from European Application Serial No. 15195895.
EPO Jun. 7, 2016 Extended Search Report and Written Opinion from European Application Serial No. 16150351.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"3GPP TR 23.708 V1.1.0 (Feb. 2015) Technical Report: 3rd Generation Partnership Project; Technical Specification Group Services and System Aspects; Architecture Enhancements for Service Capability Exposure (Release 13)," 3GPP, 650 Route des Lucioles—Sophia Antipolis Valbonne—France; Feb. 2015, 27 pages.
"3GPP TR 23.789 V1.1.0 (Feb. 2015) Technical Report: 3rd Generation Partnership Project; Technical Specification Group Services and System Aspects; Monitoring Enhancements (Release 13)," 3GPP, 650 Route des Lucioles—Sophia Antipolis Valbonne—France; Feb. 2015, 33 pages.
"3GPP TR 23.789 V13.0.0 (Mar. 2015) Technical Report: 3rd Generation Partnership Project; Technical Specification Group Services and System Aspects; Monitoring enhancements (Release 13)," 3GPP, 650 Route des Lucioles—Sophia Antipolis Valbonne—France; Mar. 2015, 33 pages.
"3GPP TS 24.008 V12.7.0 (Sep. 2014) Technical Specification: 3rd Generation Partnership Project; Technical Specification Group Core Network and Terminals; Mobile radio interface Layer 3 specification; Core network protocols; Stage 3 (Release 12)," 3GPP, 650 Route des Lucioles—Sophia Antipolis Valbonne—France; Sep. 2014, 702 pages.
"3GPP TSG-CT WG1 Meeting #92, Sanya (P.R. of China), Change Request; C1-152452 (was C1-152096)," May 25-29, 2015; 19 pages.
"3GPP TSG-CT WG1 Meeting #92, Sanya (P.R. of China), C1-152453 (was C1-152097)," May 25-29, 2015; 16 pages.
"3GPP TR 23.708 V0.3.0(Oct. 2014) Technical Report: 3$^{rd}$ Generation Partnership Project; Technical Specification Group Services and System Aspects;Architecture Enhancements for Service Capability Exposure; (Release 13)," 3GPP, 650 Route des Lucioles—Sophia Antipolis Valbonne—France; Oct. 2014; 16 pages.
"ETSI TS 124 301 V12.6.0 (Oct. 2014) Technical Specification: Universal Mobile Telecommunications System (UMTS); LTE; Non-Access-Stratum (NAS) protocol for Evolved Packet System

(56) References Cited

OTHER PUBLICATIONS (EPS); Stage 3 (3GPP TS 24.301 version 12.6.0 Release 12)," ETSI, 650 Route des Lucioles F-06921 Sophia Antipolis Cedex—France, Oct. 2014; 355 pages.
SA WG2 Meeting #106 S2-14xxxx, Title: "Key Issue for SCS Group Request for Notification or (De)Activation of PSM Use for Devices," Nov. 17-21, 2014, San Francisco, California, 2 pages.
SA WG2 Meeting #106 S2-14xxxx, Title: "Solution for Key Issue 'SCS Group Request for Notification or (De)Activation of PSM,'" Nov. 17-21, 2014, San Francisco, California, USA; 4 pages.
SA WG2 Meeting #105 S2-143328, Title: "Solution for Key Issue on SCS/AS Notification/Request for Group PSM Usage," Oct. 13-17, 2014, Sapporo, Japan; 4 pages.
SA WG2 Meeting #106 S2-144133, Title: "Solution for reachability of group of UEs that use Power Savings Mode," Nov. 17-21, 2014, San Francisco, California, USA; 5 pages.
SA WG2 Meeting #108 S2-151190, Title: "Conclusions for FS_HLcom," Apr. 13-17, 2015, San Jose del Cabo, Mexico (revision of S2-150778, 1176), 1 page.
SA WG2 Meeting #108 S2-151402, Title: "Updating solutions 2 and 6," Apr. 13-17, 2015, San Jose Del Cabo, Mexico.
"Anonymous Customer Reference—BETA," GSMA Newsroom, Feb. 21, 2013; 6 pages; http://www.gsma.com/oneapi/anonymous-customer-reference-beta/.
"MSISDN Definition and Examples." Apr. 18, 2015, 2 pages http://www.msisdn.org/.
EPO Apr. 1, 2016 Extended Search Report and Written Opinion from European Application Serial No. 15188617.3; 7 pages.
U.S. Appl. No. 14/741,281, filed Jun. 16, 2015, entitled "System and Method for Providing Power Saving Mode Enhancements in a Network Environment," Inventors: Ravi Shankar Charmarty et al.
U.S. Appl. No. 14/746,947, filed Jun. 23, 2015, entitled "System and Method for Providing Power Saving Mode Enhancements in a Network Environment," Inventors: Ravi Shankar Charmarty et al.

* cited by examiner

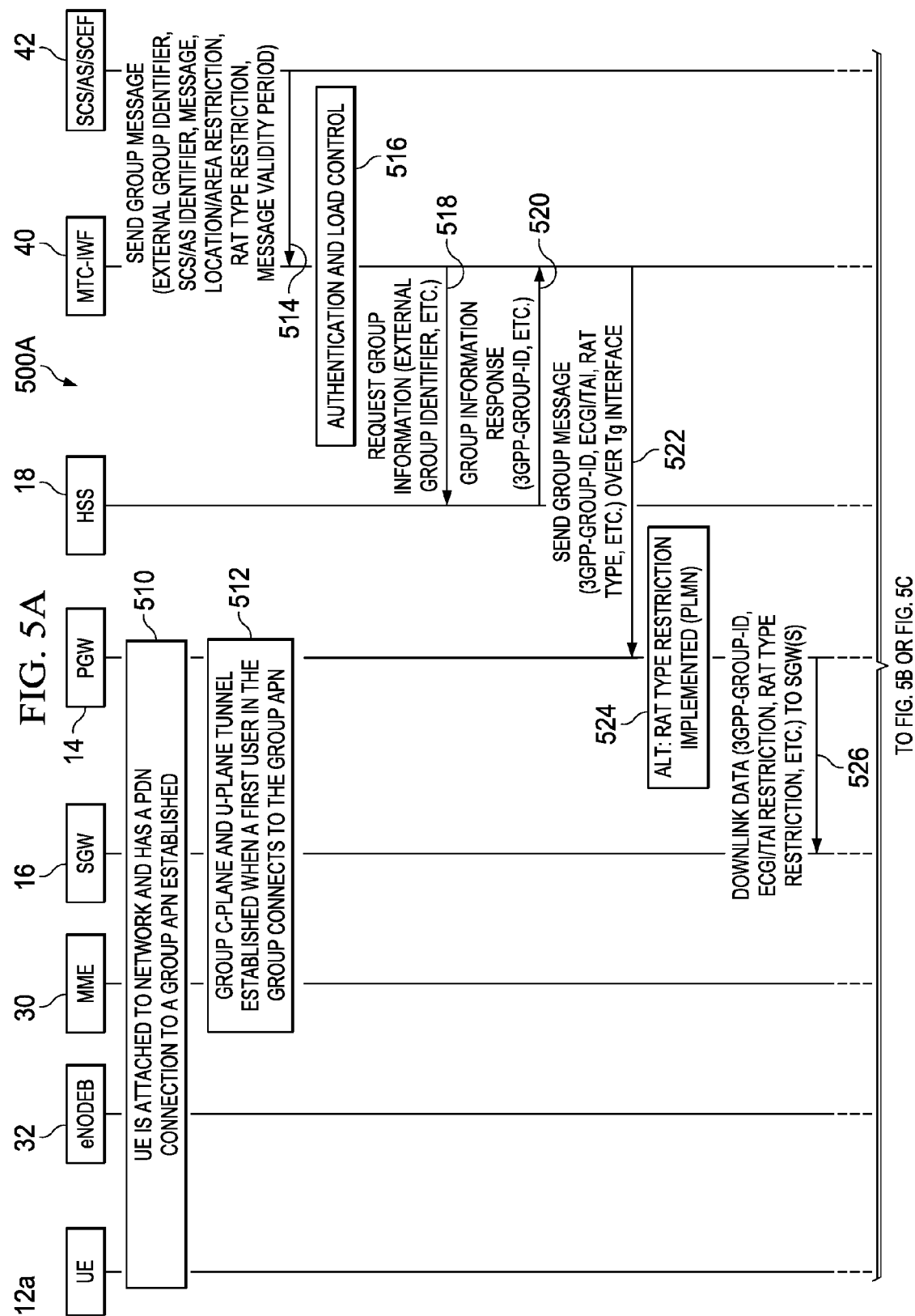

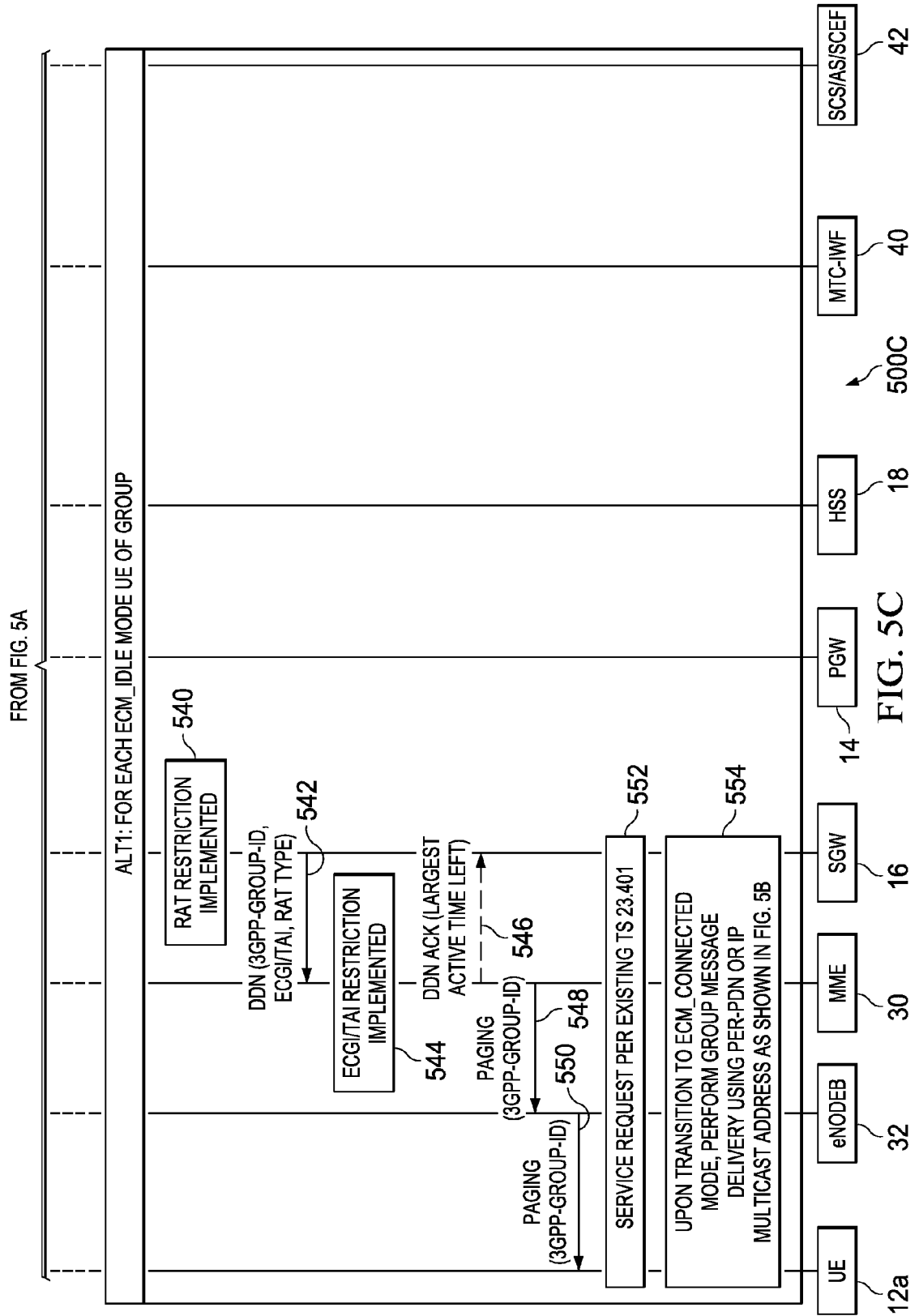

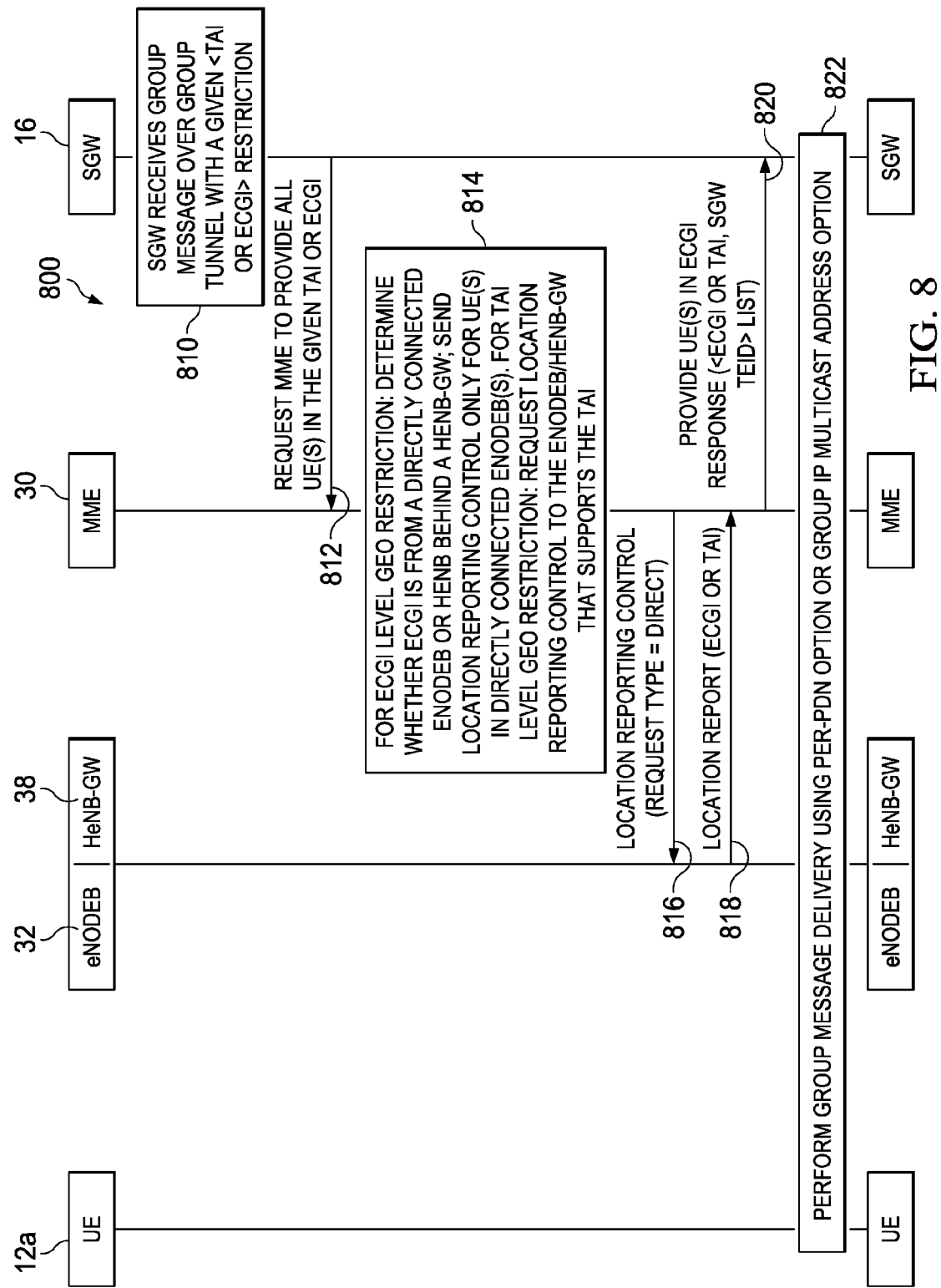

SYSTEM AND METHOD FOR PROVIDING MESSAGE DELIVERY AND PAGING TO A GROUP OF USERS IN A NETWORK ENVIRONMENT

CROSS-REFERENCE TO RELATED APPLICATION

This application claims the benefit of priority under 35 U.S.C. §119(e) to U.S. Provisional Application Ser. No. 62/020,799 entitled "SYSTEM AND METHOD FOR DELIVERING A MESSAGE DESTINED TO A GROUP OF USERS AND PROVIDING PAGING FOR THE GROUP OF USERS IN A NETWORK ENVIRONMENT" filed Jul. 3, 2014, which is hereby incorporated by reference in its entirety.

TECHNICAL FIELD

This disclosure relates in general to the field of communications and, more particularly, to a system and method for providing message delivery and paging to a group of users in a network environment.

BACKGROUND

Networking architectures have grown increasingly complex in communications environments, particularly mobile wireless environments. Data traffic has grown extensively in recent years, which has significantly increased the demands on network resources. As the number of mobile subscribers increases, efficient management of communication resources becomes even more critical. In some instances, messaging and paging a group of subscribers may cause network equipment to be overwhelmed, provide suboptimal performance or create congestion in the network. Accordingly, there are significant challenges in managing network resources, particularly for messaging and paging a group of users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-5C are a simplified flow diagram illustrating example flows and activities associated with a call flow for group message delivery and paging according to one embodiment of the present disclosure;

FIG. 8 is a simplified flow diagram illustrating other example flows and activities associated with group message delivery and paging with a geolocation restriction according to one embodiment of the present disclosure;

DETAILED DESCRIPTION OF EXAMPLE EMBODIMENTS

Overview

Group Message Delivery

Figure 1:
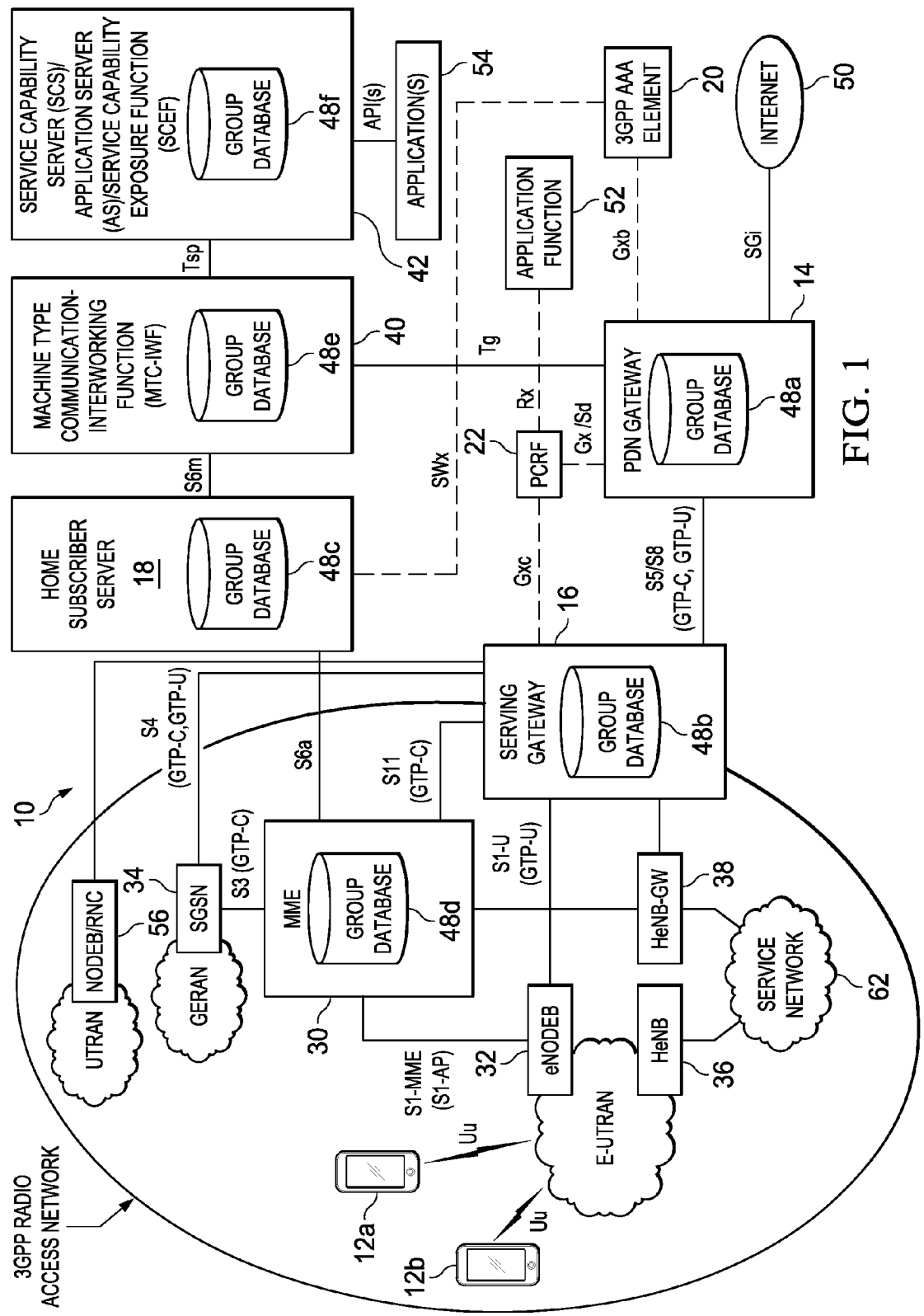
FIG. 1 is a simplified block diagram illustrating a communication system to facilitate providing message delivery and paging to a group of users in a network environment according to one embodiment of the present disclosure.

A method is provided in one example embodiment and may include communicating a message for a group of one or more user equipment (UE) from a machine type communication-interworking function (MTC-IWF) to a packet data network gateway (PGW), wherein the message includes a group identity (ID) associated with the group of one or more UE; communicating the message from the PGW to one or more serving gateways (SGWs); and communicating the message from each of the one or more SGWs to each of the one or more UE of the group via a tunnel for each of the one or more UE. In some instances, a geographic restriction can be included with the message to communicate the message to one or more UE of the group that are located within the geographic restriction. In other instances, a Radio Access Technology (RAT) type restriction can be included with the message to communicate the message to one or more UE of the group operating using the RAT type restriction. In still other instances, both a geographic restriction and a Radio Access Technology (RAT) type restriction are both included with the message.

In some cases, communicating the message by the one or more SGWs to each of the one or more UE can include communicating the message to each of the one or more UE using a destination address comprising at least one of: a link-local Internet Protocol version 6 (IPv6) prefix for a particular UE or an IP version 4 (IPv4) address for a particular UE. In other cases, communicating the message by each of the one or more SGWs to each of the one or more UE includes communicating the message to each of the one or more UE using a multicast destination address. In still other cases, the method can further include receiving the message by the MTC-IWF from a service capability server using a Tsp interface or receiving the message by the MTC-IWF from an application server using the Tsp interface; and receiving the message by the MTC-IWF from a service capability exposure function using the Tsp interface.

Group Paging

A method is provided in one example embodiment and may include configuring paging parameters for a group of one or more user equipment (UE) bases, at least in part, on a group identifier (ID) for the group of one or more UE; communicating the paging parameters to each of the one or more UE of the group; and paging one or more idle mode UE of the group according to the paging parameters to transition the idle mode UE to a connected mode for receiving a group message. In some cases, configuring the paging parameters can include configuring a paging frame and a paging occasion for the group of one or more UE based on the group ID. In other cases, configuring the paging parameters can include configuring extended paging cycle radio frames for the group of one or more UE. In still other cases, configuring the paging parameters can include configuring a paging group Radio Network Temporary Identifier (RNTI) for the group of one or more UE.

In some cases, communicating the paging parameters to each of the one or more UE of the group can include communicating the paging parameters during connection of each of the one or more UE to a group access point name (APN). In other cases, communicating the paging parameters to each of the one or more UE of the group includes communicating the paging parameters using a System Information Broadcast (SIB) communicated by an eNode B. In still other cases, the method can include communicating a message from a Mobility Management Entity (MME) to a serving gateway (SGW) including a largest remaining time for each of a periodic Tracking Area Update (TAU) timer for each one or more UE of the group in a Power Savings Mode (PSM); buffering the group message to be delivered to each of the one or more UE of the group in the PSM according to the largest remaining time; and paging the one or more UE in the PSM of the group according to the paging parameters at the expiration of the largest remaining time to transition the UE to a connected mode for receiving the group message.

Example Embodiments

Turning to FIG. 1, FIG. 1 is a simplified block diagram illustrating a communication system 10 to facilitate providing message delivery and paging to a group of users in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 may include user equipment (UE) 12a-12b, and a packet data network (PDN) gateway (PGW) 14, which has a logical connection to a serving gateway (SGW) 16. Also provided are a home subscriber server (HSS) 18, a 3GPP Authentication, Authorization and Accounting (AAA) element 20, a machine type communication-interworking function (MTC-IWF) 40 and a service capability server (SCS)/application server (AS)/ Service Capability Exposure Function (SCEF) 42. SGW 16 may have a logical connection to an evolved Node B (eNodeB) 32, to a Mobility Management Entity (MME) 30 and to a Node B (NodeB)/Radio Network Controller (RNC) 56. Both MME 30 and SGW 16 can interface with a serving general packet radio service (GPRS) support node (SGSN) 34, which may provide access for legacy universal mobile telecommunications systems (UMTS) network devices. Both SGW 16 and PGW 14 can interface with a Policy and Charging Rules Function (PCRF) 22. PCRF 22 may further interface with an Application Function 52. PGW 14 may further interface with an internet 50. MTC-IWF 40 can interface with PGW 14 via a new interface, identified as 'Tg' in FIG. 1. MTC-IWF 40 can also interface with HSS 18 and SCS/AS/SCEF 42. SCS/AS/SCEF 42 may further interface with one or more application(s) 54.

Also shown in FIG. 1 is a Home eNode B (HeNB) 36, which may interface with a Home eNode B gateway (HeNB-GW) 38 via a service network 62. In various embodiments service network 62 may overlap with or be encompassed by internet 50. Thus, communication system 10 may provide small cell access network coverage for UE (e.g., UE 12a-12b) within the system. HeNBs (e.g., HeNB 36) may provide cellular coverage for 4G/LTE/LTE-A small cell architectures. HeNB-GW 38 may interface with MME 30 and SGW 16. The interface with SGW 16 is typically provided via a Security gateway (SeGW), which is not shown in FIG. 1 for purposes of brevity.

In many network architectures, HeNBs can be deployed as autonomous units to improve reception in areas with poor coverage, or within buildings where coverage is reduced by the structure itself. Essentially, HeNBs are fully featured base stations that can provide proximate coverage in a business (e.g., enterprise) and/or residential environment. Typically, HeNBs operate at lower radio power levels as compared to macro Radio Access Networks (RANs) including eNodeBs, etc. HeNBs can be connected using a standard broadband digital subscriber line (DSL), internet, service network (e.g., service network 62) and/or cable service into a service provider's core network. Calls can be made and received, where the signals are sent (potentially encrypted) from the HeNB via the broadband IP network to one of the service provider's main switching centers.

In general terms, HeNB 36 represents a radio access point device that can allow UEs to connect to a wired network using 4G/LTE/LTE-A or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an Home Node B (HNB), or any other suitable access device, which may be capable of providing suitable connectivity to a given UE 12a-12b. In certain cases, the access point can connect to a router (via a wired network), which can relay data between UE 12a, UE 12b and other UEs of the network. In general terms, HeNB-GW may provide for connectivity and signaling between HeNB 36 and SGW 16 and MME 30 to enable seamless cellular/ mobile coverage between eNodeB 32 and HeNB 36 as UE 12a-12b move throughout the 3GPP RAN.

Each of PGW 14, SGW 16, HSS 18, MME 30, MTC-IWF 40 and SCS/AS/SCEF 42 may include a respective group database 48a-48f. In various embodiments, one or more other elements of communication system 10 may be configured with a corresponding group database. As discussed herein in this Specification, the terms 'end user', 'user' and 'subscriber' are interchangeable. Additionally as discussed herein in this Specification, the term 'eNodeB' may be used interchangeably with the term 'eNB'.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in Technical Specification (TS) 23.002, TS 23.401, TS 23.682, TS 29.272, TS 29.274, etc. The EPS generally consists of UE access networks and an Evolved Packet Core (EPC). Access networks can be 3GPP RANs (as shown in FIG. 1) for various RATs including legacy access networks such as GERAN, UMTS Terrestrial Radio Access Network (UTRAN), also referred to as 3G, or LTE/LTE-Advanced (LTE-A) radio access networks such as Evolved UTRAN (E-UTRAN), also referred to as 4G/LTE/ LTE-A, code division multiplex access (CDMA), Wideband CDMA (WCDMA) and/or CDMA2000, or they may be non-3GPP IP access networks (not shown) such as digital subscriber line (DSL), Cable, WiMAX, WiFi, or the Internet. As referred to herein in this Specification, the term 'evolved packet core' may be referred to interchangeably as a 'packet core' or a 'mobile packet core'. In various embodiments, eNodeB 32 may provide cellular coverage for 4G/LTE/ LTE-A Radio Access Networks (RANs) (e.g., E-UTRAN). In various embodiments, NodeB/RNC 56 may provide cellular coverage for 2G and/or 3G RANs (e.g., UTRAN, GERAN).

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, users operating UE 12a-12b. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include DIAMETER-based protocols, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. In various embodiments, GTP can be implemented for control plane communications (GTP-C) and/or user data plane communications (GTP-U).

As shown in FIG. 1, an Rx interface may be maintained between PCRF 22 and Application Function 52 for communicating subscriber information between IP services provided by the service provider and PCRF 22. In various embodiments, the Rx interface can be DIAMETER-based or DIAMETER-based/representational state transfer (also referred to generally as 'RESTful') Extensible Markup Language (XML) over Hypertext Transfer Protocol (HTTP) through a DIAMETER to RESTful Rx controller (not shown). In various embodiments, IP services can include IP multimedia subsystem (IMS) services, which can be provided to subscribers. PCRF 22 may provision policy charging and control (PCC) rules for PGW 14 using a DIAMETER-based Gx/Sd interface and PGW 14 may communicate subscriber information to PCRF 22 over the Gx/Sd interface. Communication system 10 may be configured with additional DIAMETER-based interfaces to manage policy and control between various elements of the system.

Various additional signaling/communication interfaces for communication system 10 may include an S56a interface between HSS 18 and MME 30; an S6m interface between HSS 18 and MTC-IWF 40; a Tsp between MTC-IWF 40 and SCS/AS/SCEF 42; an interface supporting Application Programming Interface(s) (API(s)) between SCS/AS/SCEF 42 and application(s) 54; a S1-MME (S1-AP) interface between eNodeB 32 and MME 30 (for control plane signaling); a S1-U (GTP-U) interface between eNodeB 32 and SGW 16; a S11 (GTP-C) interface between MME 30 and SGW 16; a S5/S8 interface between SGW 16 and PGW 14 and a Uu (air) interface between each UE 12a-12b and eNodeB 32. As noted above, the 'Tg' interface may be provided between MTC-IWF 40 and PGW 14, which may provide for communicating group messaging and/or addressing related information between these elements. Other signaling/communication interfaces are illustrated between various components of communication system 10 according to 3GPP standards, which are not discussed in further detail for purposes of brevity.

In various embodiments, UE 12a-12b can be associated with users, employees, clients, customers, etc. wishing to initiate a flow in communication system 10 via some network. The terms 'user equipment', 'mobile node', 'end user', 'user', and subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 10. UE 12a-12b may also be inclusive of a suitable interface to a human user such as a microphone, a display, a keyboard, or other terminal equipment.

UE 12a-12b may also be any device that seeks to initiate a communication on behalf of another entity or element such as a program, a database, or any other component, device, element, or object capable of initiating an exchange within communication system 10. In various embodiments, UE 12a-12b can include power meters, smart meters, street lamps, combinations thereof or the like, which may serve as possible target UEs (belonging to a group). Such devices have bare minimal LTE functionality (e.g., bare bones LTE stack with only one (default) PDN connection throughout its lifetime). Data, as used herein in this document, refers to any type of numeric, voice, video, media, or script data, or any type of source or object code, or any other suitable information in any appropriate format that may be communicated from one point to another. In certain embodiments, UE 12a-12b may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

The EPC generally comprises an MME, an SGW, a PGW (which may include a Policy Charging and Charging Enforcement Function (PCEF)) and a PCRF. The EPC components may be referred to generally as control nodes, control gateways or simply gateways. The gateways may be used to provide various UE services and/or functions and to implement QoS on packet flows. The services and functions may be used, for example, to provision voice over IP (VoIP) routing, enhanced services such as enhanced charging, stateful firewalls and/or traffic performance optimization (TPO). The MME is the primary control element for the EPC. Among other things, the MME may provide for UE tracking and paging procedures including, for example, retransmissions, tracking area list management, idle mode UE tracking, etc. The MME may further provide for UE bearer procedures including activation, deactivation and modification; may provide for SGW and PGW selection for UE and may provide for authentication services. The SGW is a data plane element that can manage user mobility and interfaces with RANs. The SGW also maintains data paths between eNodeBs and the PGW. The PGW provides connectivity for UE to external packet data networks (PDNs), such as, for example, internet 50. The PGW may serve as policy enforcement points to manage QoS, online/offline flow-based charging, data generation, deep-packet inspection and/or intercept.

In an embodiment, the operational functionality and services provided by SGW 16 and PGW 14 can be combined into a system architecture evolution gateway (SAE GW) (not shown), which can support combined SGW and PGW interfaces, signaling operations, functionality, services, etc. Thus, it should be understood that the embodiments, process flows, etc. discussed in the present Specification may be equally applied to communication networks that include an SAE GW.

PCRF 22 may decide policy control and/or charging activities to apply to UE based on various PCC rules. In some embodiments, PCRF 22 may communicate PCC rules to PGW 14. In various embodiments, PCRF 22 can be configured to use user subscription information as well as channel state information as a basis for policy and charging control decisions. In various embodiments, subscription information may apply for both session-based and non-session based services. For example, PCRF 22 may determine PCC rules based on an application or service described to PCRF 22 from an application function (AF) and/or SCS/AS/SCEF 42. An AF or other similar function/content service may describe applications/services to PCRF 22 that may require dynamic policy and/or charging control for one or more UE. The dynamic policy and/or charging controls may include, but not be limited to, controlling the detection for service data flows, setting charging instructions for service data flows, setting QoS levels for service data flows and/or gating. As referred to herein in this Specification, PCRF 22 may be referred to generally as a policy server.

3GPP AAA element 20 is a network element responsible for accounting, authorization and authentication functions for UE 12a-12b. For the AAA considerations, 3GPP AAA element 20 may provide a mobile node IP address and the accounting session identification (Acct-Session-ID) and other mobile node states in appropriate messaging (e.g., via an access-Request/access Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

HSS 18 can offer a subscriber database in 3GPP (e.g., Global System for Mobile Communications (GSM), LTE, etc.) environments. In one sense, HSS 18 can provide functions similar to those offered by an AAA server. When a UE moves to 3GPP access, HSS 18 can be aware of this location and the user's PDN anchor point (e.g., PGW 14). Additionally, HSS 18 can communicate with 3GPP AAA element 20 such that when a UE moves to a CDMA environment, it still has an effective anchor (e.g., PGW 14) for communications. Thus, HSS 18, 3GPP AAA element 20 and PCRF 22 can coordinate state information for UE (and synchronize this information) to achieve mobility within the system.

SCS/AS/SCEF 42 may be provided in a service provider and/or network operator domain external to the 3GPP domain elements of communication system 10 (e.g., PGW 14, SGW 16, HSS 18, 3GPP AAA element 20, PCRF 22, MME 30, etc.). In one or more embodiments SCS/AS/SCEF 42 may be provided in a service provider network, which may overlap with or couple to internet 50. In various embodiments, SCS/AS/SCEF 42 can also be used to provision various value added services that may be provided by a service provider and/or network operator.

MTC-IWF 40 may be provided as a gateway device or network element to bridge communications/signaling between one or more network operator and/or service provider SCS, AS, SCEF (e.g., SCS/AS/SCEF 42) and/or other applications/services that may be provided by the operator/service provider and the 3GPP-domain elements of communication system 10 via the Tsp interface. In various embodiments, when a service provider may operate/control an SCS, the SCS (e.g., SCS functionality of SCS/AS/SCEF 42) may be used to communicate DIAMETER-based group messaging/signaling into the 3GPP domain using MTC-IWF 40 via the Tsp interface. Thus, for SCS operation, SCS/AS/SCEF 42 may serve as an originating point for group messages being communicated to a target group of users via MTC-IWF 40.

In various embodiments, when a service provider may operate/control an application server (AS), the AS (e.g., AS functionality of SCS/AS/SCEF 42) may be used to communicate group messaging/signaling, which need not be DIAMETER-based, using one or more API procedure calls as configured by the service provider for SCS/AS/SCEF 42 and/or MTC-IWF 40. In various embodiments, a new RESTful API-based Tsp interface can be defined for group messaging. Thus, for AS operation, SCS/AS/SCEF 42 may also serve as an originating point for group messages being communicated a target group of users via MTC-IWF 40.

In various embodiments, when operating/controlling an SCEF, one or more applications 54 using one or more API(s) or API procedure calls may be used to communicate group messaging/signaling intended for a target group to the SCEF (e.g., SCEF functionality of SCS/AS/SCEF 42) via the API(s) interface. The SCEF can then communicate the group messaging/signaling to MTC-IWF 40 in a manner similar to that as described for operation of AS functionality of SCS/AS/SCEF 42. Thus, the 'Exposure layer' (SCEF) may be at the receiving end of an API call, which may be originated by application(s) 54. Use of MTC-IWF 40 may not be altered when operating an SCEF as delivery of messages destined to a group of users may become a '3GPP capability', which can be exposed via SCS/AS/SCEF 42. In such embodiments, the API(s) interface is expected to be outside the 3GPP domain.

Before detailing some of the operational aspects of FIG. 1, it is important to understand common characteristics of group messaging in commercial architectures. The following foundation is offered earnestly for teaching purposes only and, therefore should not be construed in any way to limit the broad teachings of the present disclosure. 3GPP system architecture design has historically been user-centric. To address groups/large-groups of users, Cell Broadcast Services (CBS), and Multimedia Broadcast Multicast Services (MBMS) were designed. Technical Report (TR)

23.887 defines three solutions for handling the issue of delivering messages to user(s) in a group including CBS-based, evolved MBMS (eMBMS) based, and Internet Protocol (IP) multicast based. CBS is typically capacity constrained (from a system design perspective) and reserved for usage in emergency situations for Public Warning System (PWS) services like Earthquake and Tsunami Warning System (ETWS), Commercial Mobile Alert System (CMAS), etc. MBMS is typically too much of an overkill solution as it typically requires specialized functionality on both UEs and network. Cheap/inexpensive machine-to-machine (M2M) devices aren't expected to be equipped with such complexity, especially on a large scale. Support of eMBMS, PWS, etc. can also place additional burden not only on the processing on the UEs but also on battery life, cost of such devices, etc.

Therefore, as part of 3GPP Release 13 (Rel-13) M2M work, there is a requirement to address a group of users. The detailed list of requirements can be found in Technical Specification (TS) 22.368 clause 7.2.14, and appropriate section(s) of TR 23.887 (which will be migrated to a new TR number later). Use of CBS/PWS in E-UTRAN requires UE (e.g., UE 12a-12b) to be attached to the LTE network. In LTE, at the time of attach the UE is granted at least a default PDN connection. In order for UE to remain attached to LTE, at least one PDN connection must exist. Additionally, when using eMBMS in E-UTRAN, UE are required to be LTE attached. Further, when using IP multicast in E-UTRAN, UE are also required to be LTE attached.

When addressing UEs belong to a group, it is understood that not every UE may be available in EPS connection management (ECM) CONNECTED (ECM_CONNECTED) mode but rather may be in ECM_IDLE mode. This may imply that such UEs would have to be 'woken-up' to receive a message destined to a group. This is typically the task of the MME which is accomplished by sending a 'PAGING' message over the S1-MME interface to the eNodeB. The MME also includes the identity of UE(s) it expects to answer the page. Currently, UE identities (IDs) are limited to International Mobile Subscriber Identity (IMSI) or S-TMSI (shortened-Temporary Mobile Subscriber Identity). As referred to herein in this Specification the terms 'ECM_CONNECTED mode' and 'CONNECTED mode' may be used interchangeably and the terms 'ECM_IDLE mode' and 'IDLE mode' may be used interchangeably.

Radio Resource Control (RRC) specifications limit the number of users to 16 maximum. In current operation, the eNB, upon receiving a PAGING message, may send a broadcast page. Every UE that is latched onto the cells supported by that eNB listens to the PAGING message, compares the included paging identity, and if a match is detected, acts accordingly by transitioning to ECM_CONNECTED via a Non-Access Stratum (NAS):SERVICE REQUEST. As the numbers of UEs expected to be part of a group can range from the thousands to tens of thousands, existing solution for paging a group of users can overload the RAN and potentially cause back-up of RAN system resources.

Relevant RRC specification behavior currently in-use is described in 3GPP TS 36.331, which describes the general purpose of the 3GPP paging procedure (e.g., to receive an incoming call, etc.), initiation of the paging procedure (e.g., transmitting a 'Paging' message at a UE's paging occasion and addressing multiple UE's by including a 'Paging Record' for each UE, and reception of a PAGING message by a UE (e.g., functions performed by the UE upon receiving the 'Paging' message. Additionally, 3GPP TS 36.413, §9.1.6 provides additional details regarding current information element (IE)/group name types communicated in a PAGING message from an MME to an eNodeB. These IEs/Group Names may include, but not be limited to 'Message Type', 'UE Identity Index Value', 'UE Paging Identity', 'Paging Discontinuous Reception (DRX)', 'Core Network (CN) domain', 'List of Tracking Area Identities (TAIs)' (e.g., from 1 to the maximum number of TAIs), 'Closed Subscriber Group (CSG) Identity (ID) List' (e.g., from 1 to the maximum number of CSG IDs), and 'Paging Priority'. Further, 3GPP TS 36.413, §9.2.3.13, describes additional information as currently used for the 'UE Paging Identity' IE (e.g., the identity used to page the UE), which can include additional IEs/group names such as, for example, 'CHOICE UE Paging Identity' (e.g., S-TMSI or IMSI).

In accordance with one embodiment, communication system 10 can overcome the aforementioned shortcomings (and others) by providing a system and method to provide a mechanism to deliver a message addressed to a set or group of users, identified via a '3gpp-group-id', from an external SCS/AS/SCEF (e.g., SCS/AS/SCEF 42) to UEs that are part of the group via the 3GPP network. In various embodiments, a 3gpp-group-id can be formed using octet strings, numerical systems, combinations thereof or the like. Generally, the solution provided by communication system 10 may provide features including, but not limited to: 1) group delivery of a message; 2) group delivery of a message plus optional features of restriction of group message delivery to specific geographic area(s) (e.g., identified by geo-coordinates, Evolved Cell Global Identities (ECGIs), RNC identities (IDs), Cell Global Identities (CGIs), Tracking Area Identifiers (TAIs), Location Area Identifiers (LAIs), Routing Area Identifiers (RAIs) Latitude/Longitude, any other geographic coordinate format, combinations thereof or the like) and/or by specific Radio Access Technology (RAT) types (e.g., only E-UTRAN and no UTRAN; both E-UTRAN and UTRAN but no GERAN, etc.); and 3) optional enhanced paging procedures for one or more UE belonging to a group. As discussed in further detail below, the solution(s) provided by communication system 10 may additionally include enhancements to various interfaces as well as the inclusion of additional interfaces within the system.

It should be noted that the term '3gpp-group-id', as discussed herein to identify a 'group' to receive a group-based message, can be used to distinguished between internal (to 3GPP) and external (to 3GPP) group identifiers. A 3gpp-group-id can be used for addressing/messaging users of the group. As outlined in TR 23.887, there may be at least two possible solutions for the definition of 'groups', for example, using subscription information in HSS 18 and/or through (service provider) provisioning in PCRF 22. Regardless of which method of provisioning may be used to define 'groups', during normal ATTACH/Tracking Area Update (TAU) or PDN establishment, the group information can be communicated to MME 30, SGW 16 and PGW 14 via addition of one or more appropriate IEs. The 3gpp-group-id(s) can also be associated with external group identifier(s) to be used for addressing/messaging.

One or more 3gpp-group-id(s) can be sent by HSS 18 to MME 30 (e.g., as part as normal EPS signaling) and/or to MTC-IWF 40 (e.g., when requested over 56 m). For example, HSS 18 subscription can be updated with a 3gpp-group-id on a per-user, per-APN basis (e.g., APN='internet' or 'm2m', 'group-id-messaging=A, B, C'). MME 30 may store this information (e.g., via group database 48d) in the UE Mobility Management (MM) context. Therefore, at the time of a user's attachment to the network, MME 30 may be informed of the association of APN to 3gpp-group-id(s). At the time of PDN connection for each UE (e.g., UE 12a-12b), the 3gpp-group-id(s) can be communicated by MME 30 to SGW 16. SGW 16 may, in turn, store 3gpp-group-id(s) in the EPS bearer context for the UEs (e.g., via group database 48b, etc.). Additionally, the 3gpp-group-id(s) can be sent to UEs as part of EPS mobility management/EPS session management (EMM/ESM) signaling during PDN connection establishment. Because a UE may belong to multiple groups and multiple group identifiers for addressing/messaging that may trigger same or different applications/ services running in a particular UE, the knowledge of 3gpp-group-id may allow for appropriate message handling/ routing within the UE.

In general, one or more events, operations and/or processes may be involved during operation of communication system 10 to provide delivery of a message to a group of UE. In various embodiments, SCS/AS/SCEF 42 may communicate a message destined for a target group of users to MTC-IWF 40 using the Tsp interface.

The target group may be identified via an External Group ID. Other, parameters such as, for example, a geolocation/ area and/or RAT type restriction, message expiration timer, source IP address of the sender of the message, etc. may also be communicated to MTC-IWF 40. It is assumed for the purposes of the present example that the UE are attached and have a PDN connection to a group APN established. MTC-IWF 40 may perform similar checks as described in TS 23.682 to perform SCS/AS/SCEF 42 validation, etc. In addition, MTC-IWF may request a translation of the External Group ID received from SCS/AS/SCEF 42 to an internal (e.g., internal to the 3GPP domain) 3gpp-group-id. After verification, MTC-IWF 40 can send the message to PGW 14 using the Tg interface. PGW 14 can use a new group GTP user-plane tunnel to deliver the message to SGW 16 via a Downlink Data Notification (DDN). PGW 14 can also determine users in one or more groups when one or more received 3gpp-group-ids may be received from MTC-IWF 40.

SGW 16, upon receiving this message from PGW 14 can proceed based on whether UE are in CONNECTED or IDLE mode. For ECM_CONNECTED mode user(s)/UE(s) where SGW 16 has existing S1-U tunnel(s), SGW 16 can send the message using the S1-U tunnel corresponding to the PDN connection used for the group APN. Delivery of the message to ECM_IDLE user(s)/UE(s) in a group may be provided through an operator configuration, as described herein, using one or more enhanced paging procedures. For example, if configured, SGW 16 can page UEs (via MME 30) to request switching ECM_IDLE mode user(s)/UE(s) to ECM_CONNECTED mode before delivering the message to the user(s)/UE(s) using existing S1-U tunnel(s) described above. Additional details for various options and techniques in which group message delivery and group paging can be performed using the solution provided by communication system 10 are described in further detail below.

Communication system 10 may provide several options for group message delivery to users belonging to an identified group. The primary difference between these options may be the mechanism used to deliver a message from SGW 16 down to a given UE (e.g., UE 12a). A first option may use existing per-PDN connections for group message delivery to UE of a group. For a second option, the SGW may send a group message to an IP multicast address, which may remove from the SGW the burden of maintaining IP addresses for all UEs belonging to a group and for constructing a different IP header (e.g., destination IP) for every UE belonging to the group. It is assumed that UEs belonging to a group may have an attached and have been granted PDN connection to a default Access Point Name (APN) (e.g., internet 50) at the UE and in the network. It should be understood, however, that UEs belonging to a group may have more than one PDN connection, which PDN connection to use in order to send a group message can be determined via subscription information.

Several additional assumptions may be made for the solutions provided by communication system 10 for facilitating group messaging operations, which may include: not needing special charging requirements for UE; broadcast message(s) originated by SCS/AS/SCEF 42 may not be subject to APN-aggregate maximum bit rate (APN-AMBR) or GROUP-AMBR enforcement (e.g., MTC-IWF 40 is expected take care of authorization and charging of such messages); and broadcast message(s) from SCS/AS/SCEF 42 are an IP-based payload. Not subjecting the messages to APN-AMBR or GROUP-AMBR enforcement is not expected to cause issues in traffic detection function (TDF) deployments because the PGW may provide downlink (DL) APN-AMBR enforcement. If needed, based on operator configuration, APN-AMBR or GROUP-AMBR such messages originating from SCS/AS/SCEF 42, could be subjected to such enforcement (e.g., through application of existing PCC QoS concepts).

The solution as provided the first option of group message delivery (e.g., per-PDN connection for message delivery) provided by communication system 10, as illustrated in FIG. 1, may include several enhancements and/or new functionality/interfaces. The enhancements may include enhancing the existing Tsp interface between SCS/AS/SCEF 42 and MTC-IWF 40 to provide a new DIAMETER-based Request message that can be communicated from SCS/AS/SCEF 42 to MTC-IWF 40 to include, at least in part, an External Group Identifier (recall, an External Group Identifier can be associated with a 3gpp-group-id), an SCS/AS/SCEF Identifier, application layer content of the group message, source IP address of the originator of the user plane payload, location/area information, RAT(s) information, message validity period, etc. A response message may be provided with appropriate cause codes. In various embodiments, SCS/AS/SCEF 42 selection of MTC-IWF 40 may follow the mechanisms specified in TS 23.682.

In various embodiments, the enhancements may additionally include enhancing the Tsp interface to include API interface support between MTC-IWF 40 and SCS/AS/SCEF 42. In providing API interface support, one or more procedure calls can be made, based on operator configuration, to communicate a new non-DIAMETER based Request message between SCS/AS/SCEF 42 and MTC-IWF 40 including, at least in part, an External Group Identifier, an SCS/ AS/SCEF Identifier, application layer content of the group message, source IP address of the originator of the user plane payload, location/area information, RAT(s) information, message validity period, etc. In various embodiments, a new RESTful API based Tsp interface can be defined for group messaging. In various embodiments, other protocols could be used to communicate group messages from SCS/AF 42 to MTC-IWF including, but not limited to, Simple Object Access Protocol (SOAP), XML over HTTP, etc. Again, a response message may be provided with appropriate cause codes. Thus, SCS/AS/SCEF 42 may communicate a message destined for a group of users to MTC-IWF 40 using the Tsp interface.

Other enhancements may include enhancing the existing S6m interface between MTC-IWF 40 and HSS 18. The enhancements may include providing a new Request message including, at least in part, one or more External Group Identifier(s) and SCS/AS/SCEF Identifier, which can be used to determine whether a given SCS/AS/SCEF (e.g., SCS/AS/SCEF 42) is authorized to send a message to an identified group. If groups are configured/defined in HSS 18, then a response to the Request message can include one or more 3gpp-group-id(s) associated with the one or more received External Group Identifier(s). In an embodiment, PGW 14 can then identify one or more associated users belonging to received 3gpp-group-id(s) (e.g., performing a look-up using information stored, for example, in group database 48a) communicated from MTC-IWF 40 to PGW 14. In another embodiment, HSS 18 can communicate one or more 3gpp-group-id(s) and additionally identify one or more users associated with the one or more 3gpp-group-id(s) to MTC-IWF 40.

Communication system 10 may include the new Tg interface, as shown in FIG. 1, between MTC-IWF 40 and PGW 14 (or multiple PGWs, depending on system configuration). The Tg interface between MTC-IWF 40 and PGW 14 may carry both 'control plane' and 'user plane' information for 'group-level' IP connectivity access network (IP-CAN) GTP sessions. Control plane information may be identified via parameters such as, for example, 3gpp-group-id, message, location/area information, RAT(s) information (e.g., similar to information received over Tsp and/or S6m), message validity period, etc. New parameters could also be defined based on various protocols that may be used (e.g., XMPP, DIAMETER, SOAP, XML over HTTP, etc.) as a protocol for the Tg interface. User plane information may be identified via the actual 'application layer content of a group message' (as indicated above). User plane information may also contain the source IP address of the originator of the user plane payload. It should be understood that the exact names/nature of request/responses (e.g., with appropriate codes, etc.) over the Tg interface can be determined based on a desired protocol (e.g., DIAMETER, XMPP, SOAP, XML over HTTP, etc.) to be used for the interface, which can be determined by a service provider, system designer, and/or through standards.

For embodiments involving additional geographic restrictions, location/area and/or RAT type restrictions, location/area and/or RAT information sent over Tg can include TAI(s), ECGI(s), eNB ID(s), etc. If a geo-level restriction of a group message is required at a cell level (e.g., ECGI level), then an ECGI list can be sent as a '<TAI, ECGIs in this TAI> tuple'. Sending the ECGI list as <TAI, ECGIs in this TAI> tuple can help the MME in determining which HeNB-GW to page in case the ECGI represents an HeNB behind an HeNB-GW.

In providing the new Tg interface, additional mechanisms may be provided for the MTC-IWF to select a PGW (e.g., multiple PGWs may be provided in communication system 10) for users connecting to a group APN. At the time of PDN creation for users connecting to a group APN, the selection function in MME 30 may be enhanced to select the same PGW for all users belonging to a group. A similar selection mechanism can be used by the MTC-IWF to select the PGW hosting the group of users. For example, HSS 18 may be aware of the PGW (e.g., PGW 14) to which a given UE's connection to a particular group APN is established. HSS 18 may maintain, for each 3gpp-group-id(s) a list of PGWs selected across all the UEs for each group (e.g., stored/maintained via group database 48c). Along with 3gpp-group-id(s), HSS 18 can send the address of PGW 14 as well as one or more other PGWs) to MTC-IWF 40. MTC-IWF 40 can then send a group message to PGW 14 (as well as one or more other PGWs) as indicated from HSS 18. Note, if the group identifier(s) used for address/messaging are the same as the identifier(s) used for group policing, then only a single PGW may exist for all addressed users.

The per-PDN option for group message delivery that can be provided by communication system 10 may also include enhancements to the existing S5/S8 interfaces between PGW 14 and SGW 16. These enhancements can include enhance the S5/S8 interfaces to support the new paradigm of the 'group-level' GTP session. Today, a GTP-C 'session' is a per-UE per-PDN connection level granularity. However, the solution provided by communication system 10 provides for extending the concept of a session to apply to multiple UEs having a PDN connection to a same 'group' APN. Accordingly, the enhancements to the S5/S8 interfaces can include, but not be limited to, extending the concepts of a session to new Group-Specific tunnel endpoint identifiers (TEIDs) for control (C) plane, and user (U) plane tunnels, which may be reserved for sending messages to users of a particular group.

In one or more embodiments the enhancements can include, but not be limited to, a pre-configured and/or reserved TEID for one (1) Group C- and one (1) Group U-tunnel (which can be used for communicating messages to all of one or more groups). If one Group C-plane and one Group U-plane tunnel is established between an SGW and PGW for all the groups, then these Group C-plane and U-plane tunnels may be established when the first user belonging to any group connects to the PDN via that SGW. In one or more embodiments the enhancements can include, but not be limited to, a pre-configured and/or reserved Group C- and Group U-tunnel TEID for each group. If one Group C-plane and one Group U-plane tunnel is established between an SGW and PGW for each group, then these Group C-plane and U-plane tunnels may be established when the first user belonging to each group connects to the PDN via that SGW.

The S5/S8 enhancements for the per-PDN group message delivery option may also include signaling means (e.g., create/delete group tunnel request and response similar to existing CREATE SESSION (CS) Request/CS Response (CSReq/CSResp)) to establish/tear-down TEID(s) for Group C- and Group U-plane tunnel(s) (e.g., could be one for all groups or one for each group). No special enhancements may be required for UE IP address allocation for UE in a group or for handling for UEs with IPv4 or IPv6 address (e.g., PDN Address Allocation (PAA) already carries address for v4 and prefix for v6).

For the S5/S8 enhancements, during initial PDN connection establishment for a UE, PGW 14 may inform SGW 16 of the UE's IP address in deferred v4 case to allow SGW 16 to create GTP-u packet towards the UE. The data sent by PGW 14 over S5/S8 for the group may be over GTP-U with information, including but not limited to, 3gpp-group-id, geo-location and/or RAT type restriction encoded in the GTP-U extension header. In roaming scenarios where S8 is employed, establishment of group tunnel can be based on operator configuration.

Additional S5/S8 enhancements during initial PDN connection establishment can include upon receiving a Tg trigger for group message delivery, PGW 14 may establish a new group specific control tunnel between PGW 14 and SGW 16 by performing a GTP-C protocol exchange (e.g., similar to existing Create Session Request/Response messaging and enhancing this to provide for Create Group Session and/or Tunnel Request/Response messaging) and may obtain a group specific TEID for each of one or more 3gpp-group-id(s) to establish/tear-down TEID(s) for Group C- and U-plane tunnel(s) (e.g., could be one for all groups or one for each group). PGW 14 may send downlink data to the new group specific TEID(s) for each 3gpp-group-id established via one or more GTP message(s). In various embodiments, downlink data can be sent to a pre-configured TEID for each 3gpp-group-id on one or more gateways (e.g., PGW 14, SGW 16) that may be provided in communication system 10.

The per-PDN option for group message delivery that can be provided by communication system 10 may also include enhancements to the existing S11 interface between SGW 16 and MME 30. The enhancements may be provided for two scenarios: if a given UE (e.g., UE 12*a*) is already in CONNECTED mode; and if the UE is in an IDLE mode. For UE already in CONNECTED mode, user plane data may be communicated to UEs in different manners based on IP version address case for a given UE (e.g., UE 12*a*). Say, for example, UE 12*a* may be configured with an IPv4 address. For an IPv4 UE 12*a* address case, SGW 16 may forward user plane data by framing each of one or more IP packets with a source IP address that can be either the user payload's source address received over Tsp or the IP address for SGW 16 and a destination IP address as the IP address of UE 12*a*. Each framed IP packet can be tunneled over the GTP-U towards eNodeB 32. Say, in another example, UE 12*a* may be configured with an IPv6 address. For an IPv6 UE 12*a* address case, SGW 16 may store the link-local address of UE 12*a* in an EPS Bearer context. SGW 16 may form an inner IP packet with a source IP address as either the IP address of SGW 16 or the user payload's source address received over Tsp and a destination IP address as the link-local address of UE 12*a*. Note the link-local address for a given UE can be constructed as 'FE80+IID' where the IID is received from PGW 14 in the PAA IE received in the Create Session Response at the time of PDN creation. In one or more embodiments, further optimizations may include PGW 14 assigning a same link-local address for all UE in a given group.

For UE in IDLE mode, if SGW 16 is configured to perform delivery for IDLE UEs, SGW 16 may use the TEID of any one of the users belonging to a corresponding 3gpp-group-id to send a single downlink data notification (DDN) including, at least in part, the 3gpp-group-id, an EPS Bearer ID (EBI) and an Allocation Retention Policy (ARP) to MME 30. Upon receipt, MME 30 may determine not to page the UE corresponding to its S11 TEID, but instead to initiate group paging. In general, UEs that belong to the group may receive group based paging and may respond with a Service Request (e.g., transition to CONNECTED mode). SGW 16 may also handle sessions similar to that of a last UE handing out of SGW 16, which may trigger a delete of group session (tunnel) towards PGW 14. Note additional techniques for paging IDLE mode UE are described in further detail below in discussions for optional enhanced paging techniques for communication system 10 and optional enhancements for power savings mode (PSM) UEs.

The per-PDN option for group delivery of a message can also include optional enhancements to the S1-MME interface between eNodeB 32 and MME 30 as well as optional enhancements to the Uu (e.g., over-the-air) interface between a UE (e.g., UE 12*a*-12*b*) and eNodeB 32. In various embodiments, these optional enhancements can include creating new parameters in PAGING messages such as, for example, at time of initial ATTACH, UE 12*a*-12*b* may be made to known which group they belong to via a 3gpp-group-id, which can be indicated via a new NAS IE. Additionally, 3gpp-group-id may be added to other EMM and ESM in various embodiments.

During operation, MME 30 may send a single PAGING message to each of one or more eNBs (e.g., eNodeB 32) hosting these UEs (e.g., MME 30 can track registered TAIs of these users). The PAGING message from MME 30 may be enhanced with UE identity being replaced with a group messaging identity, such as, for example, 3gpp-group-id. This can be indicated enhancing the existing UE-Paging-Identity S1-AP IE or creating a new IE. In turn, eNodeB 32 may issue a single cell-wide Radio Resource Control (RRC) PAGING message for the 3gpp-group-id. Only those UE belonging to the group (which may learn of the group(s) to which they belong during EMM/ESM procedures discussed above, e.g., ATTACH, PDN creation, etc.) indicated by the 3gpp-group-id may respond with a normal SERVICE REQUEST (e.g., to transition from ECM_IDLE to ECM_CONNECTED), depending on which group to which they may belong being identified by the 3gpp-group-id. Note additional features/enhancements for providing paging to a group of users are described in further detail below in discussions for optional enhanced paging techniques for communication system 10 and optional enhancements for PSM UEs.

As discussed above, the solution provided by communication system 10 may include a second option, which may provide for communicating a group message to an IP multicast address. For multicast addressing, additional enhancements and/or new functionality/interfaces may be provided by communication system 10. In various embodiments, these enhancements can include reserving by the Internet Assigned Numbers Authority (IANA) one IP multicast address for all messages and/or 3gpp-group-id(s). During operation, SGW 16 can send group messages to that IP multicast address and 3gpp-group-id can be expected to be sent as part of the actual message metadata to enable UE (e.g., UE 12*a*-12*b*) to distinguish messages for different groups to which they may belong.

In various embodiments, a message client on the UE may only need to listen for messages to the allocated IP multicast address. There may be no need for Internet Group Management Protocol (IGMP) support on the UE/RAN to implement the enhancements and/or new functionality/interfaces.

For the multicast address option, the enhancements to the Tsp interface and the S6m interface may be the same as described for the per-PDN group messaging option. Additionally, the provisioning of the Tg interface between MTC-IWF 40 and PGW 14 may be the same as described for the per-PDN group messaging option. For the S5/S8 interfaces, the enhancements may be similar to the per-PDN group messaging option, except that PGW 14 may not need to inform SGW 16 of a UE's IP address in a deferred IPv4 case to allow SGW 16 to create GTP-u packets toward the UE. Instead, the proposed use of a multicast address to deliver the group message may be provided.

Enhancements to the S11 interface may be provided for both CONNECTED mode and IDLE mode scenarios. If a given UE (e.g., UE 12*a*) is already in CONNECTED mode, SGW 16 can send group messages to a pre-defined multicast address (e.g., to be reserved by IANA). Note, as described above, the same multicast address can be used for all messages/groups. Additionally, the 3gpp-group-id is assumed to be sent as part of the message. In contrast, if a UE is in IDLE mode, the UE may be paged by MME 30, the same as described for the per-PDN option and once the UE is transitioned to CONNECTED mode, the UE may receive the group message from the multicast address.

Optional enhancements for the multicast addressing option with regard to the S1-MME interfaces and the Uu interface(s) with UE 12*a*-12*b* may be the same as described for the per-PDN option. Note additional features/enhancements for providing paging to a group of users are described in further detail below in discussions for optional enhanced paging techniques for communication system 10 and optional enhancements for PSM UEs.

Although described for E-UTRAN examples, it should be noted that the solutions described herein this Specification may be equally applied to Gn-managing GERAN and/or UTRAN devices (e.g., a S4-SGSN, etc.)

As noted above, the solution(s) provided by communication system 10 can, in various embodiments, provide for group delivery of a message along with an optional feature of restriction of group message delivery to a specific geographic area and/or RAT type. In various embodiments, a geographic area may be a cell sector, a cell, a group of cells, or Public Land Mobile Network (PLMN). In various embodiments, any members of a group who are outside a specified geographic area may not receive a corresponding group-based message (e.g. the device is roaming on a different network or just in a different cell in the same network). This may not affect how those inside the designated geographic area respond to the message, nor may there be an expectation that the 3GPP network do anything to try to send the message to those members of a group that happen to be outside the designated geographic area. In various embodiments, RAT type restrictions can include, but not be limited to, restrictions such as only E-UTRAN and no UTRAN; both E-UTRAN and UTRAN but no GERAN, etc. As referred to herein in this Specification, the terms 'geographic restriction', 'geo restriction' and 'geo-level restriction' can be used interchangeably.

The solution provided by communication system 10 for this optional feature may include at least two sub-options for implementing geo-level and/or RAT type restrictions for group delivery of a message. In a first sub-option, SGW 16 may implement the optional restrictions for CONNECTED mode UEs (e.g., UE 12*a*-12*b*) and MME 30 may implement the optional restrictions for IDLE mode UEs. In a second sub-option, MME 30 may implement restrictions for both IDLE and CONNECTED mode UEs. For both solutions/sub-options, SGW 16 may either have an implicit 'group message expiration timer' configured on it or such a timer can be sent by SCS/AS/SCEF 42 or another application service/server to SGW 16 via MTC-IWF 40 (using appropriate interfaces). The timer can control how long after the receipt of a group message SGW 16 may buffer the received group message for delivering the message to CONNECTED mode users (e.g., to account for IDLE mode UEs transitioning into CONNECTED mode via MME 30 paging).

For the first sub-option for implementing geo-level and/or RAT type restrictions, when MME 30 may send a Modify Bearer Request (MBR)/Modify Access Bearer Request to SGW 16 in response to every IDLE to CONNECTED mode transition of UE (e.g., UE 12*a*-12*b*) that belongs to a particular group (which, in turn, may be triggered by a SERVICE REQUEST) it may include a user location information (ULI) IE of a given UE (e.g., ECGI, Tracking Area Identity (TAI), eNB ID, etc.) with an indication that ULI inclusion is provided because the UE is part of a group and not because the PGW 14 had enabled ULI reporting. This indication is important because otherwise SGW 16 may unnecessarily forward the Modify Bearer Request to PGW 14 under existing behavior prescribed per existing 3GPP specifications.

For the first sub-option, MTC-IWF 40 may communicate group data for a group over Tg along with geolocation information (e.g., a list of one or more ECGIs, TAIs, eNBIDs, LAT/LON, etc.) and/or RAT type information to PGW 14. PGW 14 may forward the received information over the group specific S5 GTP-U tunnel to all SGWs (e.g., SGW 16) to which it may be connected. One additional optimization feature that may be included in the first sub-option can include the SGW filtering based on Mobile Country Code (MCC) and/or Mobile Network Code (MNC). For example if a TAI/ECGI list may be received having MCC/MNCs of only one specific operator, then PGW 14 can restrict sending the group message to SGWs of that PLMN only (e.g., PLMN can be identified using a combination of MCC and MNC).

For UEs that are already in CONNECTED mode, the first sub-option may provide that when SGW 16 receives data destined for a given group, using learnt ULI from MME 30, and the last learnt RAT type, SGW 16 can forward the group data only to the UEs in the requested location and/or RAT type using the enhancements and/or new functionality/interfaces as described above for group delivery of a message (e.g., per-PDN or multicast). In various embodiments, SGW 16 can determine whether ECGI, TAI, etc. of one or more UEs matches the received geo restrictions and whether any RAT restrictions were received from PGW 14. Based on the various determinations, SGW 16 can then deliver the message to the candidate UEs using the mechanisms described previously.

For the first sub-option for implementing geo-level and/or RAT type restrictions, an alternative solution can be provided for group message delivery for ECM_CONNECTED UEs with ECGI only or TAI only level geo restrictions. For this alternative solution, if SGW 16 receives a group specific DDN with TAI or ECGI level geo restriction, then it may not immediately forward the data to the ECM_CONNECTED UEs of the group since it may not accurately know the latest ECGI or TAI where the UE is in.

Accordingly, SGW 16 may send a new S11 Group GTP-C tunnel message (e.g., Request-UEs-In-TAI-ECGI-Report Message to MME 30 to report all UEs in a corresponding ECGI or TAI. If SGW 16 sends a single DDN message to MME 30 for ECM_IDLE mode UEs, as described above, then the request to report UEs in a given ECGI or TAI can be carried as in indication in the DDN message itself, rather than in a separate message. For this DDN, SGW 16 may also request MME 30 to indicate to SGW 16 a list of UEs that are in ECM_CONNECTED mode at the requested ECGI list or TAI list areas.

MME 30 may activate a one-time location reporting procedure (e.g., location reporting control with request type set as direct reporting) for all UEs belonging to the group towards the eNodeB that possesses the TAI or ECGI (e.g., the 20 most significant bits (MSB) of ECGI may represent a corresponding eNodeB ID). If the MSB 20-bits of the ECGI do not map to any eNodeB to which the MME is connected, then this could mean that the requested ECGI is that of a HeNB (e.g., HeNB 36), which may be connected to the MME via an HeNB-GW (e.g., HeNB-GW 38). For such cases, MME 30 can look-up all the UEs that are in the corresponding ECGI and may not need to activate any location reporting for such UEs. Once the E-UTRAN (e.g., eNodeB 32) returns the location report for all the UEs in the requested ECGI or TAI, MME 30 may send a single S11 message for the group to SGW 16 including the S11 SGW TEIDs of all CONNECTED mode UEs in the requested TAI or ECGI. SGW 16 can then forward the downlink data over S1-U for these reported UEs.

For UEs that are in IDLE mode, the first sub-option may provide when SGW 16 may send the DDN for group paging, it may also include the geo-location parameters and/or RAT type it received over the S5/S8 group specific tunnel. MME 30 may send the group paging only to the eNBs/cell IDs that are included the geo-location parameters and/or RAT type. Thus, only the UEs under those eNBs and ECGIs that belong to the group may respond.

If, as described for the alternative solution, paging is to be restricted to an ECGI level or TAI level, then MME 30 can determine the eNodeB(s) to be paged based on the MSB 20 bits of the ECGI. However, if the ECGI represents the cell ID of a HeNB behind an HeNB-GW, then the MSB 20 bits will not match any of the eNB ID connected to MME. If MME 30 can't determine which eNB ID it has to send the paging to, it may use the TAI to which the requested ECGI is part of to identify the HeNB-GW, as each HeNB-GW may serve a distinct set of TAIs. In this case, sending ECGI as <TAI, ECGI List> tuple as described above via the Tg interface may help to determine HeNBs.

The PAGING message as described in TS 36.413, §9.1.6 may be enhanced by adding an ECGI List parameter into it so that when an eNodeB or HeNB-GW receives the message it can determine which exact cells need to be paged. Each TAI in the TAI list can be given an ECGI list so that if a given HeNB-GW receives this, it can page the respective HeNB (ECGIs) only for the TAIs mentioned. Each HeNB can serve multiple TAIs. Only the TAIs that are mentioned need to be paged. An additional enhancement to the PAGING message can include the addition of a 'UE Group Paging Identity' IE having presence of a type 'C-group paging' if paging may be applied for Group Paging. Upon receiving a service request from each UE in a group (e.g., UE 12a-12b), MME 30 may send a Modify Bearer Request towards SGW 16. This Modify Bearer Request may be enhanced to carry one or more indicators identifying that it is in response to a group based page such that SGW 16 can identify the Modify Bearer Request accordingly in order to forward a buffered downlink group payload once the IDLE mode UEs transition to CONNECTED mode.

For the second sub-option for implementing geo-level and/or RAT type restrictions (e.g., MME 30 may implement restrictions for both IDLE and CONNECTED mode UEs), MTC-IWF 40 may send the group data over the Tg interface with list of TAI, ECGI, etc. as discussed above. PGW 14 may forward the same over the group specific S5 GTP-U tunnel to all SGWs (e.g., SGW 16) to which it may be connected. The second sub-option can include the optimization feature as described above for the first sub-option regarding PLMN determinations. For ECGI only or TAI only geo restrictions, SGW 16 may send a new S11 Group GTP-C tunnel message (e.g., Request-UEs-In-TAI-ECGI-Report Message) to all MMEs (e.g., MME 30) that serve the requested TAIs to page the IDLE mode UEs in a corresponding ECGI, TAI, etc. If SGW 16 sends a single DDN message to MME 30 for ECM_IDLE mode UEs, then the request to report UEs in an ECGI, TAI, etc. can be carried as in indication in the DDN message itself, rather than in a separate message. For this DDN, SGW 16 may also request MME 30 to indicate to SGW 16 a list of UEs that are in ECM_CONNECTED mode at the requested TAI, ECGI list areas.

MME 30 may activate a one-time location reporting procedure (e.g., location reporting control with request type set as direct reporting) for all UEs belonging to the group towards the eNodeB that possesses the TAI or ECGI. If the MSB 20-bits of the ECGI do not map to any eNodeB to which the MME is connected, then this could mean that the requested ECGI is that of a HeNB (e.g., HeNB 36), which may be connected to the MME via an HeNB-GW (e.g., HeNB-GW 38). For such cases, MME 30 can look-up all the UEs that are in the corresponding ECGI and may not need to activate any location reporting for such UEs.

Once the E-UTRAN returns the location report for all the UEs, MME 30 may send a unidirectional S11 indication (e.g., no acknowledgments (acks)) to SGW 16 including the S11 SGW GTP-C TEIDs of the CONNECTED mode UEs. Note that instead of IMSI, including GTP-C TEID can be used to minimize message size since TEID can occupy 4 bytes but IMSI in Telephony Binary Coded Decimal (TBCD) encoding can occupy 8 bytes. MME 30 may choose to send multiple such indications, for example, to allow for distributed architecture. For example, in a distributed architecture each session manager may send one indication including the list of UEs in CONNECTED mode in that session manager. SGW 16, upon receiving these indications, can start forwarding the data to CONNECTED mode UEs. In parallel, MME 30 can perform group paging only in the locations requested (e.g., TAI, ECGI) for IDLE mode UEs. The paged IDLE mode UEs can perform a Service Request and subsequently can perform a Modify Bearer Request/Response with SGW 16. Upon receiving the indication(s) from MME 30, SGW 16 can then forward the buffered downlink group payload.

Recall, the solutions provided by communication system 10 can include optional enhanced paging techniques in order to transition IDLE mode UEs to a CONNECTED mode so that they may receive a group message. For example, as noted above, at time of initial ATTACH, UEs may be made to known which group they belong to using a 3gpp-group-id. This can be indicated via a new NAS IE. Additionally, 3gpp-group-id may be added to other EMM and ESM in various embodiments. MME 30 may send a single PAGING message to each of one or more eNBs (e.g., eNodeB 32) hosting these UEs (e.g., MME 30 can track registered TAIs of these users). The PAGING message from MME 30 may be enhanced with UE identity being replaced with a group messaging identity, such as, for example, 3gpp-group-id. This can be indicated by enhancing the existing UE-Paging-Identity S1-AP IE or creating a new IE such as the 'UE Group Paging Identity', which can be additionally included in a PAGING message. Upon receipt of the PAGING message from MME 30, eNodeB 32 may issue a single cell-wide Radio Resource Control (RRC) PAGING message for the 3gpp-group-id. Only those UEs belonging to the group (which may learn of the group(s) to which they belong during EMM/ESM procedures discussed above, e.g., ATTACH, PDN creation, etc.) indicated by the 3gpp-group-id may respond with a normal SERVICE REQUEST (e.g., to transition from ECM_IDLE to ECM_CONNECTED), depending on which group to which they may belong being identified by the 3gpp-group-id.

Before detailing some of the operational aspects of FIG. 1 with respect to paging, it is important to understand common characteristics of E-UTRAN paging in commercial architectures. The following foundation is offered earnestly for teaching purposes only and, therefore should not be construed in any way to limit the broad teachings of the present disclosure. Currently for E-UTRAN paging, UEs in IDLE mode monitor their Physical DL Control Channel (PDCCH) for a Radio Network Temporary ID (RNTI) value used to indicate paging, the P-RNTI. A given UE typically only needs to monitor the PDCCH at certain UE-specific occasions (e.g., at specific subframes within specific radio frames). At other times, the UE may apply Discontinuous Reception (DRX), meaning that it can switch off its receiver to preserve battery power. PAGING messages may be received in subframes 0, 4, 5 or 9 in each radio frame depending on network configuration. The network typically distributes the UE in time domain (paging occasion) for the PAGING message reception. In case multiple UEs are addressed on the PDCCH, a paging group can be included in a Radio Resource Control (RRC) PAGING message, which can contain UE identities of individual UEs addressed by the paging group.

In essence, both a particular UE and the network are in sync with respect to a Paging Offset (PO) and Paging Frame (PF) in which a PAGING message destined for the UE is contained in order for that UE to receive it. Note the combination of PO and PF may be referred to herein in this Specification as 'PO+PF'. Note further that the terms 'Paging Offset' and 'Paging Occasion' can be used interchangeably herein in this Specification. The synchronization of PO+PF can be made possible using a formula which accounts for different inputs including, but not limited to: '@eNB', representing an MME-provided UE identity (e.g., GUTI, S-TMSI, etc.); and '@UE', representing an UE's IMSI (e.g., IMSI of a subscriber associated with the UE).

Typically, the eNodeB configures which radio frames and subframes are used for paging. The eNodeB can broadcast paging control channel (PCCH) related configuration parameters to UE as shown in TABLE 1 via a System Information Broadcast (SIB):

TABLE 1

PCCH-Config ::= SEQUENCE { defaultPagingCycle ENUMERATED {rf32, rf64, rf128, rf256}, nB ENUMERATED {fourT, twoT, oneT, halfT, quarterT, oneEighthT, oneSixteenthT, oneThirtySecondT}

In some instances, a dedicated paging cycle can be configured by the network. In such instances, the minimum cycle of the two (e.g., default and dedicated paging cycle) takes precedence. The UE can calculate the Paging Radio Frame (e.g., Paging Frame) and Paging radio subframe (e.g., Paging Occasion) in which it is to listen for a PAGING message using the following equations (Eq.):

$$\text{SFN mod } T = (T/N) \times (\text{UE\_ID mod } N) \quad \text{Eq. 1}$$

$$i\_s = \text{UE\_ID}/N\_\text{mod } Ns \quad \text{Eq. 2}$$

$$T = \text{UE DRX cycle(e.g., paging cycle)} = \min(Tc, Tue) \quad \text{Eq. 3}$$

$$N = \min(T, nB) \quad \text{Eq. 4}$$

$$Ns = \max(1, nB/T) \quad \text{Eq. 5}$$

For the equations: 'SFN' is the System Frame Number; 'Tc' is the cell-specific default paging cycle {e.g., 32, 64, 128, 256} radio frames; 'Tue' is the UE-specific paging cycle {e.g., 32, 64, 128, 256} radio frames; 'N' is the number of Paging Frames within the paging cycle of the UE; 'UE_ID' is the IMSI (20 mod 1024) with IMSI being the decimal rather than the binary number; 'i_s' is an index pointing to a pre-defined table defining the corresponding subframe; 'nB' is the number of 'paging subframes' per paging cycle (across all UEs in a cell); and 'Ns' is the number of 'paging subframes' in a radio frame that are used for paging.

In general, UE can listen to the 'normal paging' mechanism based on the existing mechanism. In order to address a group of UEs via a same PAGING message (also referred to herein as 'Group Paging'), existing paging mechanisms may not work since the paging frame and paging occasion is calculated based on the UE ID, will be different for each UE in a group. For a given UE to be able to receive a group PAGING message, a new mechanism of computation of Paging Occasion+Paging Frame detection is needed for both UE and eNodeBs. Note Paging Occasion+Paging Frame can collectively be referred to as the 'Paging Instance' for a UE.

In one or more embodiments, communication system 10 can provide one or more solutions, which can enable UE to receive corresponding group PAGING messages (e.g., UEs can belong to more than one group). For the solutions provided by communication system 10, it is assumed that MME 30 has been made aware of UE (e.g., UE 12a-12b) to group associations (e.g., which can be stored in group database 48d). Various techniques can be used to provide MME group awareness, including, but not limited to, S6a signaling from HSS 18 during UE ATTACH, local configuration via PCRF 22 and/or PGW 14 during UE ATTACH/PDN creation, etc. It is assumed that UEs belonging to a group have previously attached and have been granted a PDN connection to the LTE/LTE-A network. Note this does not mean that all UEs belonging to a group must be attached to the network for operation of the enhanced paging procedures described herein; for example, the ones which aren't attached aren't expected to be address with the following paging solutions.

For a first possible paging solution, a group ID (e.g., 3gpp-group-id) may be used to derive paging parameters such as the Paging Frame and Paging Occasion value using the legacy mechanisms described above. In addition to the normal paging wake-up UEs configured with 3gpp-group-id (e.g., during the ATTACH procedure), the first paging solution may involve using the 3gpp-group-id instead of the UE_ID for the calculation of the Paging Frame and Paging Occasion. For the first paging solution, UEs configured with one or more corresponding 3gpp-group-id(s) (e.g., during the ATTACH Procedure) can use the 3gpp-group-id(s) in order calculate the Paging Frame and Paging Occasion in which to listen for the Group Paging using Equations 6 and 7, where 'GR_ID' is a given 3gpp-group-id:

$$\text{SFN mod } T = (T/N) \times (\text{GR\_ID mod } N) \quad \text{Eq. 6}$$

$$i\_s = \text{GR\_ID}/N\_\text{mod } Ns \quad \text{Eq. 7}$$

For a second possible paging solution, the paging parameters may include the Paging Frame and Paging Occasion for Group Paging configured via SIBs. The first possible paging solution provides a viable solution so long as the number of groups in which a given UE participates or is a member is limited to a few groups. Note that for each group for which the UE is member, there may be one additional paging instance added per Paging Cycle for the UE. In other words, for every new group a given UE joins, the amount of paging wake-up occasions added for the UE can increase accordingly. As it is possible that UE may be required to join multiple groups, the first possible paging solution may be sub-optimal from the perspective of UE battery usage/consumption.

To address this issue, a common Paging Instance (e.g., collectively, Paging Frame and Paging Occasion) and Paging Cycle value that is optimized based on system resource availability may be allocated for Group Paging using the second possible paging solution. This configuration can be broadcast in an SIB message that a given UE (e.g., UE 12a and/or 12b) acquires when it selects and/or re-selects a given cell (e.g., eNodeB). Based on the SIB configuration, the UE can be configured to wake-up for the Group Paging only once to read the PAGING message. The number of groups that can be required to activate the UEs can be configured via the Paging Record IE in a PAGING message.

For a first alternative for the second paging solution, eNodeB 32 can configure Paging Frame+Paging Occasion and Paging Cycle for Group Paging. For this alternative, UE connected to the eNodeB may only be required to wake-up during the paging occasion to read the PAGING message. For example, when a given UE wakes up using the Group Paging configuration, the UE may read the PAGING record to find the 3gpp-group-id(s) for which it is member. TABLE 2, provided below, illustrates an example SIB that can be configured by the eNodeB and broadcast to UE of one or more groups.

TABLE 2

```
SystemInformationBlockType2 ::= SEQUENCE {
********** Skipped unchanged part ******************
radioResourceConfigCommon RadioResourceConfigCommonSIB,
********** Skipped unchanged part ******************
RadioResourceConfigCommon ::= SEQUENCE {
********** Skipped unchanged part ******************
PCCH-Config-group-v13x ::= SEQUENCE {
defaultPagingCycle ENUMERATED {
rf32, rf64, rf128, rf256},
Frame Offset            Integer
SubFrame Offset         Integer
}
Paging ::= SEQUENCE {
pagingRecordList PagingRecordList OPTIONAL, - - Need ON
systemInfoModification ENUMERATED {true} OPTIONAL, - - Need ON
etws-Indication ENUMERATED {true} OPTIONAL, - - Need ON
nonCriticalExtension Paging-v890-IEs OPTIONAL - - Need OP
}
```

It is reasonable to assume the requirement to listen for Group Paging may be less stringent compared to the normal PAGING messages. In case of heavy paging load, it may be possible for the system to delay the group PAGING messages. In such instances, the current range of the Paging Cycle (e.g., 32, 64, 128, 256) may not be sufficient. Thus, longer Paging Cycle durations may be needed in order for the network to provide more flexibility to distribute group PAGING messages.

Thus for a second alternative for the second paging solution, eNodeB 32 may broadcast an 'Extended Paging Cycle' via the SIB that would be applicable for Group Paging. TABLE 3, shown below, illustrates an Extended Paging Cycle radio frames configuration as compared to a normal Paging Cycle configuration.

TABLE 3

```
NORMAL PAGING CYCLE CONFIGURATION
PCCH-Config ::= SEQUENCE {defaultPagingCycle ENUMERATED
{rf32, rf64, rf128, rf256}, nB ENUMERATED {fourT, twoT, oneT,
halfT, quarterT, oneEighthT, oneSixteenthT, oneThirtySecondT}
EXTENDED PAGING CYCLE CONFIGURATION
PCCH-Config-r13 ::= SEQUENCE {ExtendeddefaultPagingCycle
ENUMERATED {rf32, rf64, rf128, rf256, rf512, rf1024, rf2048},
```

In practice, in order to maintain the same efficiency of L1/L2 control channel as for normal DL scheduling operation, it may be desired to transmit more than one PAGING record in one DL subframe (e.g., multiple PAGING records). However, considering of the probability of simultaneously arrival of a paging event, this means that the number of UE which may be monitoring the same DL subframe can be high. Thus, during Paging Occasions, (e.g., group of UEs listening in the same Transition Time Interval (TTI) for a possible PAGING message) since Group Paging may activate several UEs, it is plausible that the eNodeB may not put other UEs for normal PAGING in the PAGING record during such Paging Occasions. In such cases, a normal UE may decode the downlink shared channel (DL-SCH) and find no paging record for itself, which may result in unnecessary battery loss for the UE.

Hence, it may be beneficial to use a separate (PAGING) RNTI configured for a Paging Group. The benefit in such cases may be that the UE can read the PDCCH (control region) and look for a Paging Group RNTI (P-G-RNTI) during the Paging Occasion. Only for the cases when it may find the P-G-RNTI, may it read the Physical Downlink Shared Channel (PDSCH) (data region) for the broadcast message.

Thus for a third possible paging solution, eNodeB 32 may include a new Paging Group RNTI (e.g., P-G-RNTI) on the PDCCH for Group Paging if the eNodeB is used for the Group Paging. The UE in a given group can then look for the P-G-RNTI during the Paging Occasion and read the PDSCH only if it finds P-G-RNTI in the PDCCH control region.

Paging procedures for UTRAN and GERAN may differ from E-UTRAN paging procedures and are described in further detail below. In UTRAN, two types of paging procedures exist: paging 'Type 1' for Idle mode, cell paging channel (CELL_PCH) mode and UTRAN Registration Area PCH (URA_PCH) mode UEs; and paging 'Type 2' for connected mode (e.g., cell dedicated channel (CELL_DCH) mode and cell forward access channel (CELL_FACH) mode UEs.

For Paging Type 1, the paging message can utilize the PCCH logical Channel, the PCH transport channel and the secondary common control physical channel (S-CCPCH) Physical Channel. In a cell, one or multiple PCH can be configured and each PCH can be mapped to the SCCPCH. For each defined PCH there is a paging indicator channel (PICH) defined by System Information Block 5 (SIB5). The PICH can be used to broadcast paging indicators (PIs) which can trigger groups of UE to decode subsequent paging messages. A UE may listen to the PICH physical channel once per DRX cycle and may subsequently listen for a corresponding PCH message if a positive PI is indicated in the PICH. If the PICH is associated to the S-CCPCH, the PICH timing is $\tau_{PICH}=7680$ chips prior to its corresponding S-CCPCH frame timing (e.g., the timing of the S-CCPCH carrying the PCH transport channel with the corresponding paging information). A paging indicator set in a PICH frame can mean that the paging message is transmitted on the PCH in the S-CCPCH frame starting $\tau_{PICH}$ chips after the transmitted PICH frame. Note $\tau_{PICH}$ is defined in TS 25.211 §7.1.

For UTRAN, the PICH is a fixed rate (e.g., subframe (SF) rate=256) physical channel used to carry the paging indicators. The PICH is always associated with an S-CCPCH to which a PCH transport channel is mapped. For example, one PICH radio frame of length 10 ms consists of 300 bits. Of these, 288 bits are used to carry paging indicators. The remaining 12 bits are not formally part of the PICH and may not be transmitted (DTX). The number of PI per radio frame could be 18, 36, 72 or 144. If 18 PI are used this can mean that each PI can occupy 16 bits (e.g., 8 modulation symbols) whereas if 144 PI is used then each PI can use 2 bits (e.g., one modulation symbol). Minimizing the number of PIs can increase the redundancy (e.g., the coverage of the PICH). On the other hand, as the number of UEs belonging to each PI group increases, a particular UE may receive the positive PI more frequently and may subsequently decode the S-CCPCH more frequently.

Accordingly, Equations 8 and 9, shown below, can be used to calculate a PI for Group Paging as follows, where 'GR_ID' is a given 3gpp-group-id:

$$PI = DRX\ Index\ mod\ Np \qquad \text{Eq. 8}$$

$$DRX\ Index = GR\_ID\ div\ 8192 \qquad \text{Eq. 9}$$

In Frequency Division Duplexing (FDD) mode, Np can be 18, 36, 72 or 144 as the number of Page Indicators per frame, and may be provided in an IE 'Number of PI per frame' as part of a system information block in FDD mode. In Time Division Duplexing (TDD) mode, Np can be the number of Page Indicators per paging block and can be calculated by a Paging Indicator Length (LPI), a Burst Type (e.g., long or short midamble for a 3.84/7.68 Mega chips per second (Mcps) TDD option) and the PICH repetition length, each of which can be provided in a system information block.

In case more than one PCH and associated PICH may be indicated in the SIB5, a given UE can select an S-CCPCH from one listed in the SIB5 using the 3gpp-group-id (e.g., instead of IMSI as is typical for normal UE operation) as follows in Equation 10, where 'GR_ID' is a given 3gpp-group-id:

$$Index\ of\ selected\ S\text{-}CCPCH = GR\_ID\ mod\ K \qquad \text{Eq. 10}$$

For Equation 10, K may equals the number of listed S-CCPCHs that carry the PCH (e.g., S-CCPCH carrying the FACH may not be counted). These S-CCPCHs can be indexed in the order of their occurrence in SIB5 from 0 to K−1. The 'Index of selected SCCPCH' can identify the selected S-CCPCH with the PCH and the uniquely associated PICH to be used by the UE. Once the UE had identified the S-CCPCH (e.g., in case of multiple S-CCPCHs) carrying the PCH, the UE shall detect the System Frame Number (SFN) or Paging occasion during which its PI will be transmitted. The value of the Paging Occasion can be determined as shown in Equation 11, where 'GR_ID' is a given 3gpp-group-id, as follows:

$$Paging\ Occasion = \{(GR\_ID\ div\ K)mod(DRX\ cycle\ length\ div\ PBP)\}*PBP + n*DRX\ cycle\ length + Frame\ Offset \qquad \text{Eq. 11}$$

For Equation 11, 'n' may be equal to 1, 2, etc. as long as SFN remains below its maximum value. Additionally, 'PBP' is a Paging Block Periodicity, which can be set to 1 in FDD mode. In TDD mode, PBP can be broadcast in a SIB message and can include a repetition period/length as prescribed in TS 25.331 §10.3.6.49 which can be any of (4/2), (8/2), (16/2), (16/4), (32/2), (32/4), (64/2) or (64/4).

In GERAN, a packet common control channel (PCCCH) may be found on several carriers and on several time slots per carrier. For GERAN, the parameter BS_PCC_CHANS (maximum value: 16) defines the number of packet data channels (PDCHs) carrying the PCCCHs. In various embodiments, a given UE can be configured to identify the specific PCCCH according to a PCCCH_GROUP parameter. The PCCCH_GROUP may be numbered from 0 to BS_PCC_CHANS−1. The network may broadcasts to the UE the organization of PCCCH by providing a list of used carriers. The mapping between the PCCCH_GROUP and the physical channel may follow the PCCCH description broadcast on a packet broadcast control channel (PBCCH). The lowest-numbered PCCCH_GROUP can be mapped on the lowest-numbered time slot carrying PCCCH on the first PCCCH carrier. The next-higher-numbered PCCCH_GROUP can be mapped on the next-higher-numbered time slot carrying the same carrier, and so on. When all time slots of the first PCCCH carrier are used, the next-higher-numbered PCCCH_GROUP can be mapped on the lowest-numbered time slot carrying PCCCH on the next PDCH that carries, and so on. PCCCH_GROUP may be determined as shown in Equation 12, where 'GR_ID' is a given 3gpp-group-id, as follows:

$$PCCH\_GROUP = (GR\_ID\ mod\ 1000)mod(BS\_PC\_C\_CHANS \times N)mod\ N \qquad \text{Eq. 12.}$$

For GERAN, a base station paging channel multiframes parameter 'BS_PA_MFRMS' defines the number of 51-multiframes for the periodicity of PCH subchannel paging decoding. The value may be broadcast on a broadcast control channel (BCCH) and may range from 2 to 9. For instance, if the value is equal to '9' (nine), a given UE may decode its paging subchannel every nine 51-multiframes. The number of paging subchannels 'N' on one physical channel carrying the CCCH can be equal to the number of paging blocks in one 51-multiframe multiplied by the periodicity of subchannel paging decoding (e.g., the BS_PA_MFRMS value). Thus, 'N' may be equal to the number of paging blocks 'available' on one CCCH value deduced from parameters broadcast on the BCCH.

Accordingly, the solutions provided by communication system 10 may provide several advantages for paging UE belonging to a group, which are to receive a group-based message. For example, RAN resources in the licensed spectrum are considered to be precious resources. Paging a UE is one of the most frequent operations undertaken by the RAN. As the number of UEs in a given RAN node and the corresponding traffic generated by those UEs grows, the number of pages, assuming average RRC Idle timers being in the order of 30 sec-2 min, can grow exponentially. The solutions provided by communication system 10 allow for highly efficient means of paging multiple UEs belonging to a group, which could range in the order of hundreds to thousands to tens of thousands (e.g., power meters from residences in a city, UE within a city, neighborhood, borough, etc.). Thus, the solutions provided by communication system 10 may aid in the conservation of RAN resources for paging UEs belonging to a group.

In order to page the correct UE groups, the MME can provide the 3gpp-group-id to the S1-AP PAGING message with the inclusion of the 'UE Group Paging Identity'. Hence the S1-AP PAGING message may be enhanced by adding a 3gpp-group-id parameter into it so that when an eNodeB receives the message for actual UE groups to page, the eNodeB can include the 3gpp-group-id received in the S1-AP PAGING message in the PAGING Record IE under the RRC PAGING message when performing the group paging.

From 3GPP Release 12 (Rel-12) onwards, a new functionality called Power Savings Mode (PSM) has been introduced. Details of PSM mode can be found in TS 23.401 and TS 23.060. When enabled (e.g., as determined based on an MME and/or SGSN decision) as indicated by an 'Active Time', a given UE (e.g., UE 12a-12b) can shut off its Access Stratum layer for the duration of Active Time (provided in ATTACH/TAU response) but its NAS continues to run. PSM differs from normal IDLE mode UE behavior where the Access Stratum layer is still listening for PAGING and other broadcast messages. The mode was created essentially to save power/battery on M2M devices. Thus, it is reasonable to expect M2M devices to support PSM feature. If PSM is active (e.g., PSM enabled), then until the next periodic TAU/Routing Area Update (RAU) timer expiration, the MME and/or SGSN may not page PSM enabled UEs. Instead, all network-initiated signaling e.g. DDNs will be rejected or "no Ack'ed" (Nack'ed) by MME 30. Only the PSM-activated UE, the MME and/or the SGSN are aware when PSM is active.

In accordance with one or more embodiments, communication system 10 can provide for MME 30 to page IDLE-mode UEs belonging to a specific group. In one embodiment, paging PSM-activated UE may be handled the same as for non-PSM enabled UE. In another embodiment, when SGW 16 sends a DDN including a 3gpp-group-id on a given user's S11 tunnel to MME 30, MME 30 can send a new message back to SGW 16 with a list of group IMSIs for which PSM is active (or piggyback the message on an S11 Group GTP C-tunnel DDN, as described above, for the second sub-option for implementing geo-level and/or RAT type restrictions where MME 30 may implement geo and/or RAT type restrictions for both IDLE and CONNECTED mode UEs of a group). SGW 16 can extend a 'guard timer' for the identified IMSIs (e.g., an amount of time that the SGW may buffer the message destined for delivery to PSM-activated UE in the group) to ensure message delivery to such PSM-activated UE.

In still another embodiment, when SGW 16 sends a DDN including a 3gpp-group-id on a given user's S11 tunnel to MME 30, MME 30 can send a new message back to SGW 16 (or piggyback the message) with an applied PSM time (e.g., time remaining) for the PSM-activated UE. If MME 30 has activated PSM for any of the UE(s) being addressed by 3gpp-group-id, and if configured to accommodate message delivery for PSM devices, then MME 30 can send, in a DDN Acknowledgement to SGW 16, the largest of Active Time remaining of the PSM enabled UE(s).

In cases where a single MME (e.g., MME 30) may have determined different PSM times for different UE in a group identified by a given 3gpp-group-id, the MME may communicate the largest Active Time remaining of the UE(s) back to SGW 16. In cases where multiple MMEs may connect to a same SGW for a given group, and if the SGW identifies different PSM time values for PSM-activated UE, then the multiple MMEs may select the largest PSM time to communicate to SGW 16. If SGW 16 receives different values from each MME, then, in one embodiment, it can select the largest of the received values (e.g., referred to as the 'largest active time remaining').

For each PSM-activated UE, MME 30 may keep track of expiration of Active Time per existing Rel-12 specifications. In another embodiment, SGW 16 can select the larger of the 'largest active time remaining' and the largest of a 'guard timer' for buffering the messages destined for delivery to UE in the group.

In yet another embodiment, MME 30 may identify the PSM-activated UEs based on active Mobility Management (MM) contexts. MME 30 may also identify whether such UEs belong to a group identified by a corresponding 3gpp-group-id, which are to receive a group message. If so, MME 30 may include identities of all UEs belonging to the group except for the PSM-activated UEs for PAGING using techniques described above. At expiration of periodic TAU/RAU timers of each of the excluded PSM-activated UEs, MME 30 may appropriately page the PSM-activated UEs using techniques described above.

Figure 2:
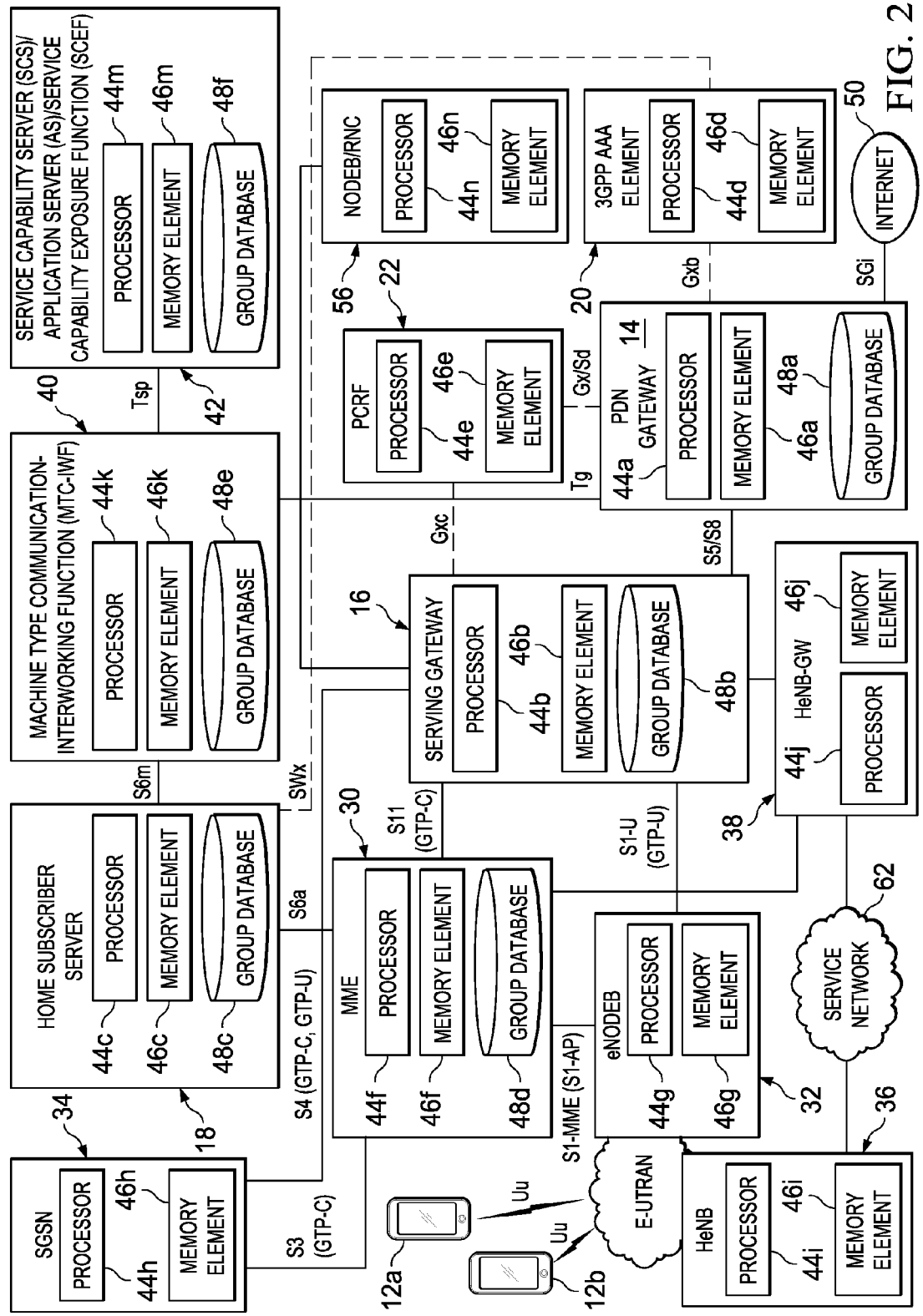
FIG. 2 is a simplified block diagram illustrating example details associated with one potential embodiment of the communication system.

Turning to FIG. 2, FIG. 2 is a simplified block diagram illustrating additional details associated with one potential embodiment of communication system 10. FIG. 2 includes PGW 14, SGW 16, HSS 18, 3GPP AAA element 20, PCRF 22, MME 30, eNodeB 32, SGSN 34, HeNB 36, HeNB-GW 38, MTC-IWF 40, SCS/AS/SCEF 42 and NodeB/RNC 56 of communication system 10. Each of these elements may include a respective processor 44a-44n and a respective memory element 46a-46n. Also shown in FIG. 2, PGW 14 includes group database 48a; SGW 16 includes group database 48b; HSS 18 includes group database 48c; MME 30 includes group database 48d; MTC-IWF 40 includes group database 48e and SCS/AS/SCEF 42 includes group database 48f. In various embodiments, one or more other elements of communication system 10 may be configured with a corresponding group database.

Hence, appropriate software and/or hardware can be provisioned in PGW 14, SGW 16, HSS 18, 3GPP AAA element 20, PCRF 22, MME 30, eNodeB 32, SGSN 34, HeNB 36, HeNB-GW 38, MTC-IWF 40, SCS/AS/SCEF 42 and NodeB/RNC 56 in order to facilitate message delivery and paging to a group of users in a network environment. Note that in certain examples, certain databases (e.g., group databases 48a-48f, which can store, for example, user/UE group related information, 3gpp-group-id(s), bearer contexts, EPS bearer IDs, group TEIDs, RAT information, geographic information, multicast address(es), etc.) can be consolidated with memory elements (or vice versa), or the storage can overlap/exist in any other suitable manner. Also shown in FIG. 2 are UE 12a-12b, internet 50 and service network 62.

In one example implementation, PGW 14, SGW 16, HSS 18, 3GPP AAA element 20, PCRF 22, MME 30, eNodeB 32, SGSN 34, HeNB 36, HeNB-GW 38, MTC-IWF 40, SCS/AS/SCEF 42 and NodeB/RNC 56 are network elements, which are meant to encompass network appliances, servers, routers, switches, gateways, bridges, loadbalancers, firewalls, processors, modules, or any other suitable device, component, element, or object operable to exchange information that facilitates or otherwise helps in providing for delivery of a message to a group of users and for paging a group of users (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGW 14, SGW 16, HSS 18, 3GPP AAA element 20, PCRF 22, MME 30, eNodeB 32, SGSN 34, HeNB 36, HeNB-GW 38, MTC-IWF 40, SCS/AS/SCEF 42 and NodeB/RNC 56 can include memory elements for storing information to be used in achieving group messaging and/or group paging operations, as outlined herein. Additionally, each of these devices may include a processor that can execute software or an algorithm to perform group messaging activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to PGW 14, SGW 16, HSS 18, 3GPP AAA element 20, PCRF 22, MME 30, eNodeB 32, SGSN 34, HeNB 36, HeNB-GW 38, MTC-IWF 40, SCS/AS/SCEF 42 and/or NodeB/RNC 56 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and UE can also include suitable interfaces for receiving, transmitting, and/or otherwise communicating data or information in a network environment.

Note that in certain example implementations, the group messaging and/or group paging functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, an electrically erasable PROM (EEPROM)) or an ASIC that includes digital logic, software, code, electronic instructions, or any suitable combination thereof.

Figure 3:
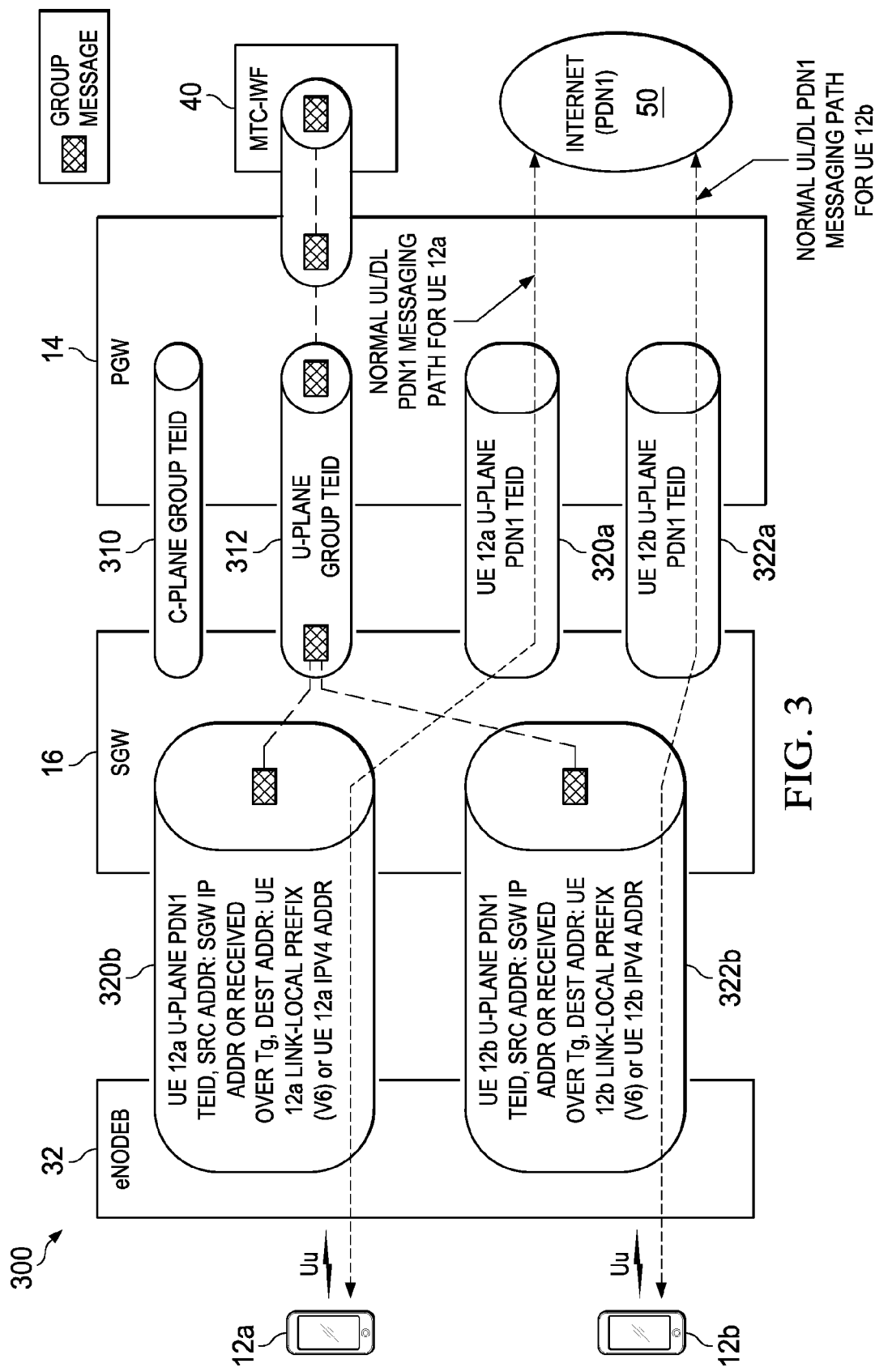
FIG. 3 is a simplified block diagram illustrating details associated with control and bearer plane tunnels according to one embodiment of the present disclosure.

Turning to FIG. 3, FIG. 3 is a simplified block diagram illustrating details associated with control and bearer plane tunnels for a UE destination address use case 300 according to one embodiment of communication system 10. FIG. 3 includes PGW 14, SGW 16, eNodeB 32, and MTC-IWF 40 of communication system 10. UE 12a-12b are also shown in FIG. 3, as well as is internet 50, which may include a first packet data network (PDN1), through which UE 12a-12b may have a connection established. FIG. 3 illustrates a case where a given UE destination address may be used for the first message delivery option (e.g., per-PDN connection), as discussed above, to provide for delivery of one or more group message(s) to UE 12a-12b. Although FIG. 3 is illustrated in reference to eNodeB 32, it should be noted that message delivery may be performed using NodeB/RNC 56 in a similar manner as for eNodeB 32.

FIG. 3 illustrates various tunnels, their corresponding TEIDs and source/destination address information. The following tunnels are illustrated between SGW 16 and PGW 14: a C-plane group tunnel 310 having a C-plane group TEID; a U-plane group tunnel 312 having a U-plane group TEID; a UE 12a U-plane PDN1 tunnel 320a having a UE 12a U-plane PDN1 TEID; and a UE 12b U-plane PDN1 tunnel 322 having a UE 12b U-plane PDN1 TEID. The following tunnels are illustrated between eNodeB 32 and SGW 16: a UE 12a U-plane PDN1 tunnel 320b having the UE 12a U-plane PDN1 TEID; a Source Address (SRC ADDR), which can be set to the IP address of SGW 16 or received over Tg; and a Destination Address (DEST ADDR), which can be set to a UE 12a link-local prefix (e.g., for PMIPv6) or a UE 12a IPv4 address; and a UE 12b U-plane PDN1 tunnel 322b having the UE 12b U-plane PDN1 TEID; a SRC ADDR, which can be set to the IP address of SGW 16 or received over Tg; and a DEST ADDR, which can be set to a UE 12b link-local prefix (e.g., for PMIPv6) or UE a 12b IPv4 address.

As illustrated in FIG. 3, a group message may be communicated from MTC-IWF 40 to PGW 14 (e.g., via the Tg interface). PGW 14 may communicate the group message to SGW 16 according to the U-plane group TEID. SGW 16 may distribute or 'fan-out' the group message to each of UE 12a-12b using their corresponding U-Plane PDN1 TEIDs and destination addresses. In various embodiments, 3ggp-group-id(s) (e.g., per-UE, per-APN subscription) can be sent to SGW 16 during PDN creation (and/or during handover (HO)) to aid SGW 16 in determining appropriate PDN connection(s) to use for sending group messages. In one or more embodiments, such information may be stored or maintained via group database 48b within SGW 16.

Further shown in FIG. 3 is an uplink (UL)/downlink (DL) PDN1 messaging path for UE 12a, which may traverse the UE 12a U-plane PDN1 tunnel 320b between eNodeB 32 and SGW 16. SGW 16 may route UL/DL messaging for UE 12a to PGW 14 via the UE 12a U-plane PDN1 tunnel 320a to PDN1. A similar UL/DL messaging path can be provided for UE 12b using the UE 12b U-plane PDN1 tunnels 322a-322b.

Figure 4:
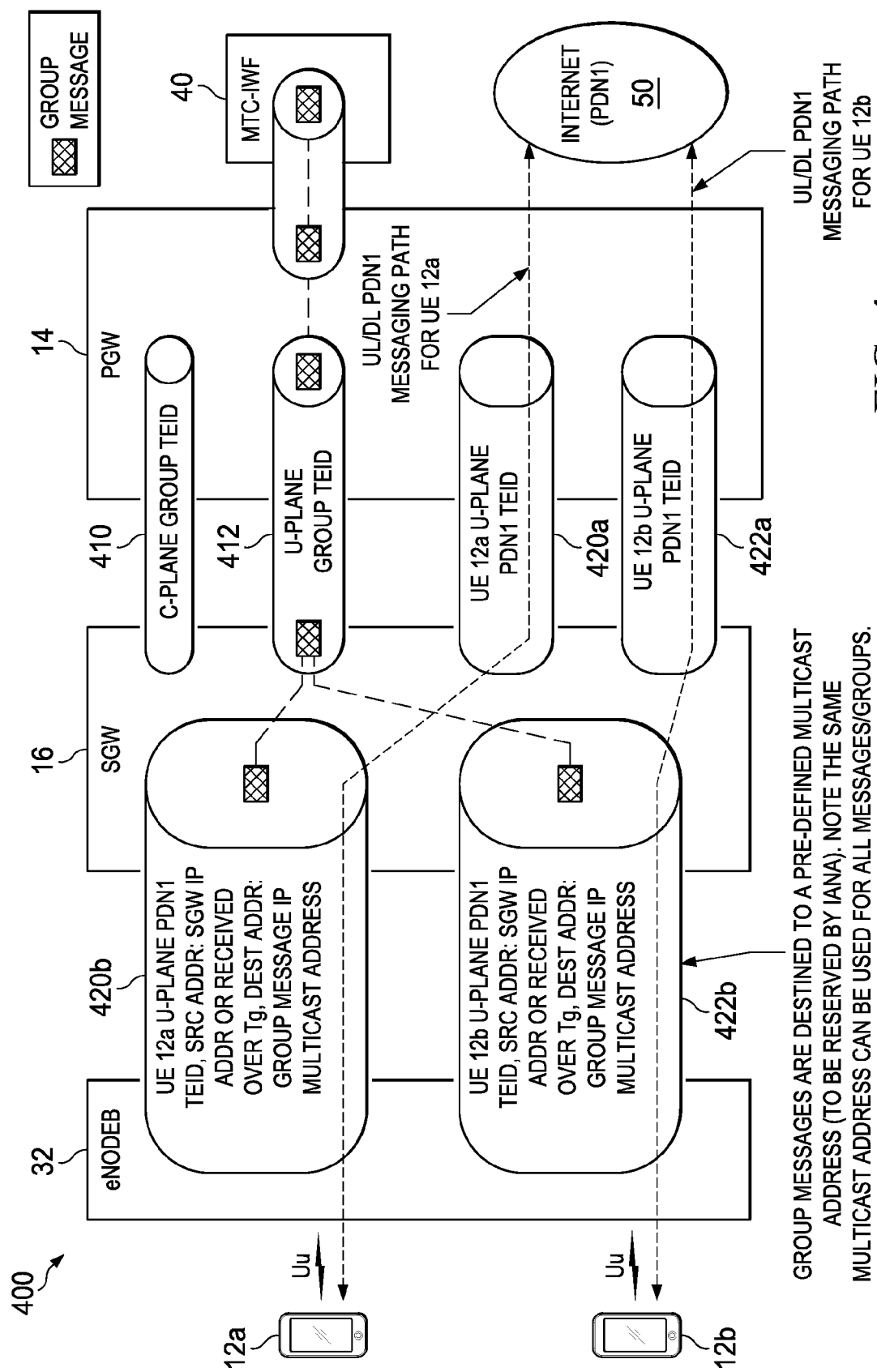
FIG. 4 is a simplified block diagram illustrating details associated with control and bearer plane tunnels for multicast group addressing according to one embodiment of the present disclosure.

Turning to FIG. 4, FIG. 4 is a simplified block diagram illustrating details associated with control and bearer plane tunnels for a group message IP multicast address use case 400 according to one embodiment of communication system 10. FIG. 4 includes PGW 14, SGW 16, eNodeB 32, and MTC-IWF 40 of communication system 10. UE 12a-12b are also shown in FIG. 4, as well as internet 50, which may include a first packet data network (PDN1), through which UE 12a-12b may have a connection established. FIG. 4 illustrates a case where a given IP multi-cast address may be used for the second message delivery option (e.g., per-PDN connection), as discussed above, to provide for delivery of one or more group message(s) to UE 12a-12b. Although FIG. 4 is illustrated in reference to eNodeB 32, it should be noted that message delivery may be performed using NodeB/RNC 56 in a similar manner as for eNodeB 32.

As shown in FIG. 4 the following tunnels may be established between SGW 16 and PGW 14: a C-plane group tunnel 410 having a C-plane group TEID; a U-plane group tunnel 412 having a U-plane group TEID; a UE 12a U-plane PDN1 tunnel 420a having a UE 12a U-plane PDN1 TEID; and a UE 12b U-plane PDN1 tunnel 422b having a UE 12b U-plane PDN1 TEID.

The tunnels between SGW 16 and eNodeB 32 shown in FIG. 4 may differ from the tunnels shown in FIG. 3. As shown in FIG. 4, a UE 12*a* U-plane PDN1 tunnel 420*b* may the UE 12*a* U-plane PDN1 TEID; a SRC ADDR, which can be set to the IP address of SGW 16 or received over Tg (similar to FIG. 3); and a DEST ADDR, which can be set to a group message IP multicast address (different from FIG. 3). Similarly, a UE 12*b* U-plane PDN1 tunnel 422*b* may have a UE 12*b* U-plane PDN1 TEID; a SRC ADDR, which can be set to the IP address of SGW 16 or received over Tg; and a DEST ADDR, which can be set to the group message IP multicast address. As shown in FIG. 4, group messages may be destined to a pre-defined multicast address, which can be reserved by IANA. Note that the same multicast address can be used for all messages/groups. A group ID (e.g., 3gpp-group-id) is assumed to be sent as part of the message.

As illustrated in FIG. 4, a group message may be communicated from MTC-IWF 40 to PGW 14. PGW 14 may communicate the group message to SGW 16 according to the U-plane group TEID. SGW 16 may distribute or 'fan-out' the group message to each UE 12*a*-12*b* using their corresponding U-Plane PDN1 TEIDs and the group message IP multicast destination addresses.

Regarding the multicast addressing message delivery option provided by communication system 10, source specific multicasting (SSM) support may not be required for the solution. SSM is defined in RFC 4607, where SSM address usage is described as shown in TABLE 4, shown below.

TABLE 4

| |
| --- |
| 1) IPv4: 232/8 (232.0.0.0 to 232.255.255.255) |
|    Not for use: 232.0.0.0 |
|    Reserved for IANA: 232.0.0.1-232.0.0.255 |
| 2) IPv6: FF3x::/32 |
|    Not for use: FF3x::4000:0000 |
|    Reserved for IANA: FF3x::4000:0001-FF3x::7FFF:FFFF |

One reason for not using the two 'Not for use' addresses may be to preserve one invalid SSM destination for IPv4 and IPv6, which can be useful in an implementation as a null value. One reason for IANA reserving above the address ranges described in TABLE 4 may be to allow use for services with wide applicability, which either require or would strongly benefit if all hosts use a well-known SSM destination address for a particular service. Considerations may be made for conditions, such as those on an Ethernet network, where all datagrams sent to any SSM destination address will be transmitted with the same link-layer destination address, regardless of the source. Furthermore, SSM destinations in 232.0.0.0/24 and 232.128.0.0/24 may use the same link-layer addresses as the reserved IP multicast group range 224.0.0.0/24, which may be considered. Similar consideration may be given to the IPv6 reserved multicast addresses.

The rest of available multicast addresses (within the ranges described in TABLE 4) are available for use as long as source and destination comply with RFC 4607. In various embodiments, a policy for allocating non-reserved SSM addresses for sending applications can be strictly locally determined by a sending host. Thus, SSM support may not be required for the multicasting solution provided by communication system 10. However, if source address validation is needed at a given UE, then complying to RFC 4607 should be sufficient, in which case, the UE may need to learn of the source multicast address of SGW 16. In various embodiments, this could be performed as part of S11 signaling (e.g., SGW 16 can indicate an intended source multicast address to be used) and/or NAS signaling (e.g., communicated to a given UE via a new IE in EMM/ESM signaling).

Figure 5B:
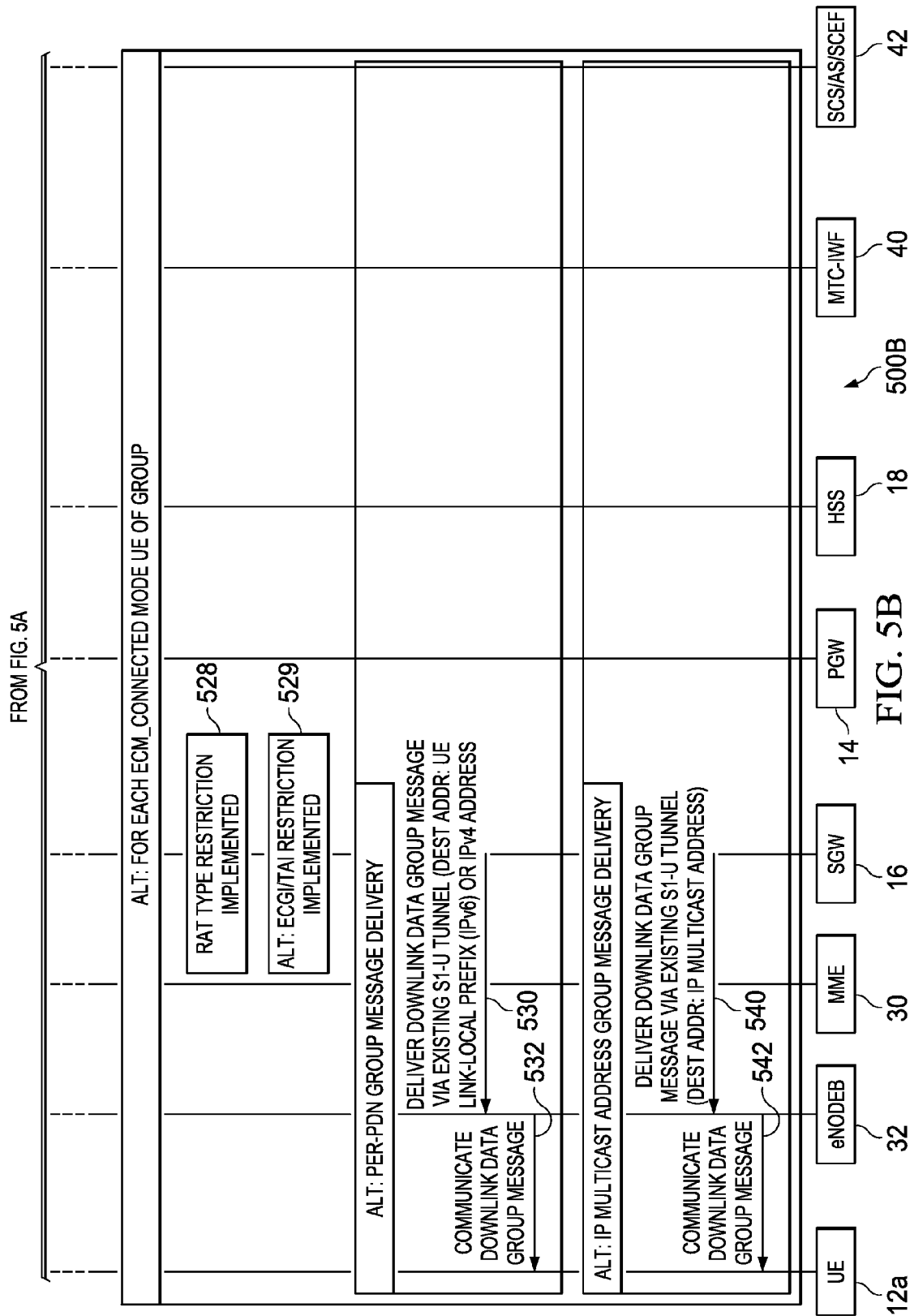

Turning to FIGS. 5A-5C, FIGS. 5A-5C are simplified flow diagrams 500A-500C illustrating example flows and activities associated with a call flow for group message delivery and paging for a user according to one embodiment of the present disclosure. FIGS. 5A-5C include a given UE (e.g., UE 12*a*) to receive a group message, PGW 14, SGW 16, HSS 18, MME 30, eNodeB 32, MTC-IWF 40 and SCS/AS/SCEF 42. As shown at 510 for FIG. 5A, the example call flow, assumes that UE 12*a* is attached to the EPC and has a PDN connection to a group APN established via PGW 14. As shown at 520, a 'group' C-plane and U-plane tunnel can established when a first user in the group (e.g., UE 12*a*) connects to the group APN.

At 514, SCS/AS/SCEF 42 may send a message destined for a target group of users (e.g., UE 12*a*-12*b*) to the MTC-IWF 40 using the Tsp interface. The target group can be identified using an External Group ID. Per existing Tsp specifications, an SCS/AS/SCEF identifier may be included. Optionally, other information such as source IP address of the originator of the message payload, location/area restriction information, RAT(s) restriction information, message expiration/validity timer, etc. can also be sent.

In various embodiments, the source IP address of the origination of the message payload can optionally be sent to allow proper population of source IP address for the GTP-u packet by SGW 16. In various embodiments, the location/area restriction can be in geo-coordinates (e.g., LAT/LON, etc.), civic address or TAI/ECGI granularity. If received in geo-coordinates or civic address format, MTC-IWF 40 may convert the received information to TAI/ECGI level granularity. In various embodiments, if SCEF functionality is being operated/controlled for SCS/AS/SCEF 42, such civic address format to TAI/ECGI conversion can be performed by SCS/AS/SCEF 42.

At 516 MTC-IWF 40 can perform similar checks as described in TS 23.682 Section 5.2.1 for SCS/AS/SCEF 42 identification validation, quota or rate violation, etc. MTC-IWF 40 may optionally perform message payload size validation. If the payload exceeds either the Service Level Agreement (SLA) agreement or a maximum configured size, then MTC-IWF 40 may reject the message delivery request from SCS/AS/SCEF 42. At 518, MTC-IWF 40 may request group information from HSS 18 using the External Group ID.

HSS 18 may translate the External Group id to an 'internal' (e.g., internal to the 3GPP domain) group ID (e.g., 3gpp-group-id) and may communicate the 3gpp-group-id to MTC-IWF 40 at 520. In various embodiments, 3gpp-group-id may uniquely identify an addressing/messaging group within a PLMN. In various embodiments, HSS 18 may be configured with message delivery RAT restriction as well. In such cases, information sent by HSS 18 to the MTC-IWF 40 may override information received by MTC-IWF 40 over the Tsp or API interface from SCS/AS/SCEF 42. HSS 18 may also communicate PGW identities (e.g., for more than one PGW) selected for handling users belong to the group identified by 3gpp-group-id.

After verification, MTC-IWF 40 uses 'Tg' interface to send the group message to all PGW identities (e.g., PGW 14) received from HSS 18 including the 3gpp-group-id. If location/area restrictions exist, then after conversion to TAI/ECGI, this information can also be sent to PGW 14. If the location/area restrictions are needed at a cell (ECGI)

level, then the ECGI list can be sent as <TAI, ECGIs in this TAI> tuple. Sending the ECGI list as <TAI, ECGIs in TAI> tuple can help MME 30 in determining which HeNB-GW to page in case the ECGI represents a HeNB behind a HeNB-GW.

If RAT type restrictions exist, then after appropriate validation this information can also be sent to PGW 14. Any information received over Tsp (as mentioned above) such as source IP address of the originator of the message payload, message expiration/validity timer can also be sent from MTC-IWF 40 to all PGW identities (e.g., PGW 14). In various embodiments, a 'Message-id' to identify the message transmission on the Tg interface can also be included with the group message.

Using 3gpp-group-id, PGW 14 can retrieve the EPS bearer context of all associated UEs (identified via IMSIs) to which the delivery of the group message is intended. At 526, PGW 14 may send downlink data via a Group U-plane tunnel to each SGW (e.g., SGW 16) anchoring the UEs in the group. If a given 3gpp-group-id involves users spanning multiple PGWs, then each PGW can sends a downlink data message to each SGW peer identified via EPS bearer context. In various embodiments, 'Message-id' can also be included with the group message to identify the message transmission. Message-id can be used by SGW 16 to avoid retransmissions of the same message when received from multiple PGWs. In various embodiments, as shown at 524, the identified one or more PGWs (e.g., PGW 14) can also determine whether all users of the group belong to only one PLMN. If so, the PGWs may communicate group messages to only those SGWs belonging to the PLMN.

In various embodiments, Location/area restrictions, RAT type restrictions, message expiration/validity timer, message-id, etc. can also be sent in downlink data as GTP-U headers. In embodiments where GTP-U message fragmentation or bloating may be a concern (e.g., due to the number of TAI/ECGI restrictions) then it also possible to send this information via the Group C-plane tunnel via a new nodal level message.

The flows and activities may continue to flow diagram 500B as shown in FIG. 5B for ECM_CONNECTED mode users or to flow diagram 500C as shown in FIG. 5C for ECM_IDLE mode users.

Consider in a first example, that UE 12*a* is in an ECM_CONNECTED mode when SGW 16 receives a group message destined to UE 12*a*. SGW 16 can implement RAT type restrictions for ECM_CONNECTED mode users at 528. Recall, in various embodiments SGW 16 can also implement ECGI/TAI geo restrictions for ECM_CONNECTED mode users as shown at 529 or can relay this information to MME 30 to implement the geo restrictions. Depending on configuration, SGW 16 can send the group message to UE 12*a* using either the per-PDN delivery option or the IP multicast address delivery option based on the configuration of communication system 10.

At 530, for ECM_CONNECTED users where SGW 16 has existing S1-U tunnel(s), it can deliver the downlink data group message using the S1-U tunnel corresponding to eNodeB 32 for the PDN connection used for the group APN. In various embodiments, the destination address can be associated with the UE IPv6 link local prefix or the UE IPv4 address.

For UE that have been allocated an IPv4 address for the PDN connection, say for example UE 12*a* has been allocated an IPv4 address, SGW 16 may create a GTP-U packet by framing the IP packet with source address as either the user payload's source address received via the Tsp, Tg, S5/S8 route or the IP address of SGW 16. The destination address can be the UE's IPv4 address. This framed IP packet is tunneled over the GTP-U towards eNB. If the IPv4 address for UE 12*a* is allocated through DHCPv4 as specified in clause 5.3.1.2.4 of 3GPP TS 23.401 (deferred IPv4 allocation) then the PGW shall inform the SGW through an Update Bearer Request message of the allocated IPv4 address for the UE.

For those UE who have been allocated an IPv6 address for the PDN connection, say in another example UE 12*a* has been allocated an IPv6 address, SGW 16 can create a GTP-U packet by framing the IP packet with source IP address as either the user payload's source address received via Tsp, Tg, S5/S8 route or SGW's own IP address. The destination IP address can be the link-local address of UE 12*a*. In various embodiments, the link-local address for UE can be constructed as FE80+Interface Identifier (IID) which is received from PGW 14 in PAA IE in Create Session Response at the time of PDN creation (per existing specs). At 532, eNodeB can communicate the downlink data group message to UE 12*a* via its S1-U tunnel.

If the received downlink packet for the group has an ECGI level only or TAI level only geo restriction, then the SGW need not forward the group data to all ECM_CONNECTED mode UEs of that group immediately. Rather the SGW may follow processes as described in further detail in FIG. 8 for ECGI level only or TAI level only geo restrictions.

In various embodiments, until the message expiration/validity timer (e.g., received via the Tsp, Tg, S5/S8 route) expires, SGW 16 may buffer the message for delivery to IDLE mode UEs, which may be converted to connected mode using one or more of the Paging techniques described herein. After its expiration, SGW 16 may discard the message. However, if SGW 16 receives a 'largest active time remaining' value, and if configured to accommodate message delivery for PSM devices, then SGW 16 can replace the message expiration/validity timer with the value received for 'largest active time remaining'. This may allow SGW 16 to buffer the message until the last PSM-activated UE connects to the network, thereby ensuring message delivery to such device.

In various embodiments, the destination address can also be a group message IP multicast destination addresses, as shown by the IP multicast address group message delivery option shown in FIG. 5B at 540 and 542. For the IP multicast address group message delivery option, the destination address may be set to a given IP multicast address for group message delivery. In various embodiments, the IP multicast address can be the same for all groups or can be different between different groups.

As noted above, the flows and activities of flow diagram 500A of FIG. 5A can also continue to the flows and activities of flow diagram 500C of FIG. 5C for ECM_IDLE mode users. Delivery of the group message to ECM_IDLE UE(s) in a group can be an operator configuration. For the flows and activities shown in FIG. 5C, any of the Group Paging techniques described herein can be used to configure Group Paging for a group of users (e.g., UE 12*a*) including, but not limited to, modifying the Paging Frame and Paging Occasion (e.g., collectively, Paging Instance) for Group Paging using the 3gpp-group-id through UE configuration during ATTACH using by substituting 3gpp-group-id for UE_ID in legacy calculation mechanisms; modifying the Paging Instance for Group Paging using the 3gpp-group-id configured via SIBs using default Paging Cycles (e.g., either having a different Paging Instance for each group that a UE joins or a common Paging Instance; modifying the Paging Instance for Group Paging using the 3gpp-group-id configured via SIBs using Extended Paging Cycles; including a new P-G-RNTI during on the PDDCH during the Paging Occasion for a UE or combinations thereof.

SGW 16 can implement RAT type restrictions for ECM_CONNECTED mode users at 540. At 542, SGW 16 may use the TEID of any one of the users belonging to 3gpp-group-id (e.g., the user associated with UE 12*a*) to send a single Downlink Data Notification including the 3gpp-group-id, EBI, ARP, ECGI/TAI restriction, etc. to MME 30. Note EBI and ARP are existing parameters, shown here for brevity. In the example flows and activities shown in FIG. 5C, MME 30 may implement ECGI/TAI restriction(s) for ECM_IDLE mode UE at 544.

If MME 30 has activated PSM for any of UE being addressed by 3gpp-group-id, and if configured to accommodate message delivery for PSM devices, then it may sends in Downlink Data Notification Acknowledgement to SGW 16 at 546 including the largest of Active Time remaining for the PSM activated UE. If SGW 16 receives different values from multiple MMEs, then it can select the largest of the received values (e.g., 'largest active time remaining'). Note, for each PSM-activated UE, MME 30 may track expiration of Active Time per existing Rel-12 specifications.

MME 30 may use the presence of 3gpp-group-id to determine whether to page the group identified by 3gpp-group-id or just the UE whose MM context is represented by the S11 TEID this message is received on. If the former, MME 30 may send a PAGING message to only those eNodeBs matching TAI/ECGI restriction criteria, for example, eNodeB 32 as shown at 548, with the PAGING identity set to 3gpp-group-id. If the paging has to be restricted at an ECGI level, then MME 30 can determine the eNodeB (e.g., eNodeB 32) to be paged based on the MSB 20 bits of ECGI. However, if the ECGI represents the cell ID of a HeNB behind a HeNB-GW, then the MSB 20 bits may not match any of the eNB ID connected to MME 30. If MME 30 can't determine which eNodeB ID it has to send the paging to, it can use the TAI to which this ECGI is part of to identify the HeNB-GW. Each HeNB-GW may serve a distinct set of TAIs. In such instances involving HeNB(s) behind an HeNB-GW, sending ECGI as <TAI, ECGI List> tuple as note above may be useful.

At 550, eNodeB 32 may sends the group PAGING message to UE 12*a*. In various embodiments, if ECGI is included, then the group PAGING message can be restricted to ECGIs identified by MME 30. At 552, UE 12*a* belonging to the group can respond to the page using the 'Service Request Procedure' described in 3GPP TS 23.401, Section 5.3.4.3 to convert from ECM_IDLE mode to ECM_CONNECTED mode. As noted, the paging enhancements for communication system 10 can include sending of ECGI in the PAGING message along with the 3gpp-group-id. Correspondingly, the Paging Occasion formula as shown above in Equations 6 and 7 can be modified to account for the 3gpp-group-id. Note, however, that ECGI may only be sent from MME 30 to eNodeB 32 and may not be included in the group PAGING message sent from eNodeB 32 to UE 12*a*.

After UE 12*a* transitions to ECM_CONNECTED mode, SGW 16 can, based on configuration, deliver the message to UE 12*a* via the S1-U tunnel at 554 using either the per-PDN message delivery option as shown in steps 530 and 532 of FIG. 5B or the IP multicast address delivery option as shown in steps 540 and 542 of FIG. 5B.

The steps discussed in FIG. 5C describe a technique to a initiate a DDN by using the TEID of any one of one or more UE belonging to the group represented by 3gpp-group to initiate paging for IDLE mode UE of the group represented by 3gpp-group-id. In various embodiments, another alternative can be used which could involve SGW 16 either initiating a DDN for each UE belonging to the group or sending a DDN with a 3gpp-group-id to trigger group paging. MME 30 could then use existing paging mechanisms to page each UE in the group individually. This approach may ensure no impact to S1-AP and Uu interface procedures.

Figure 6:
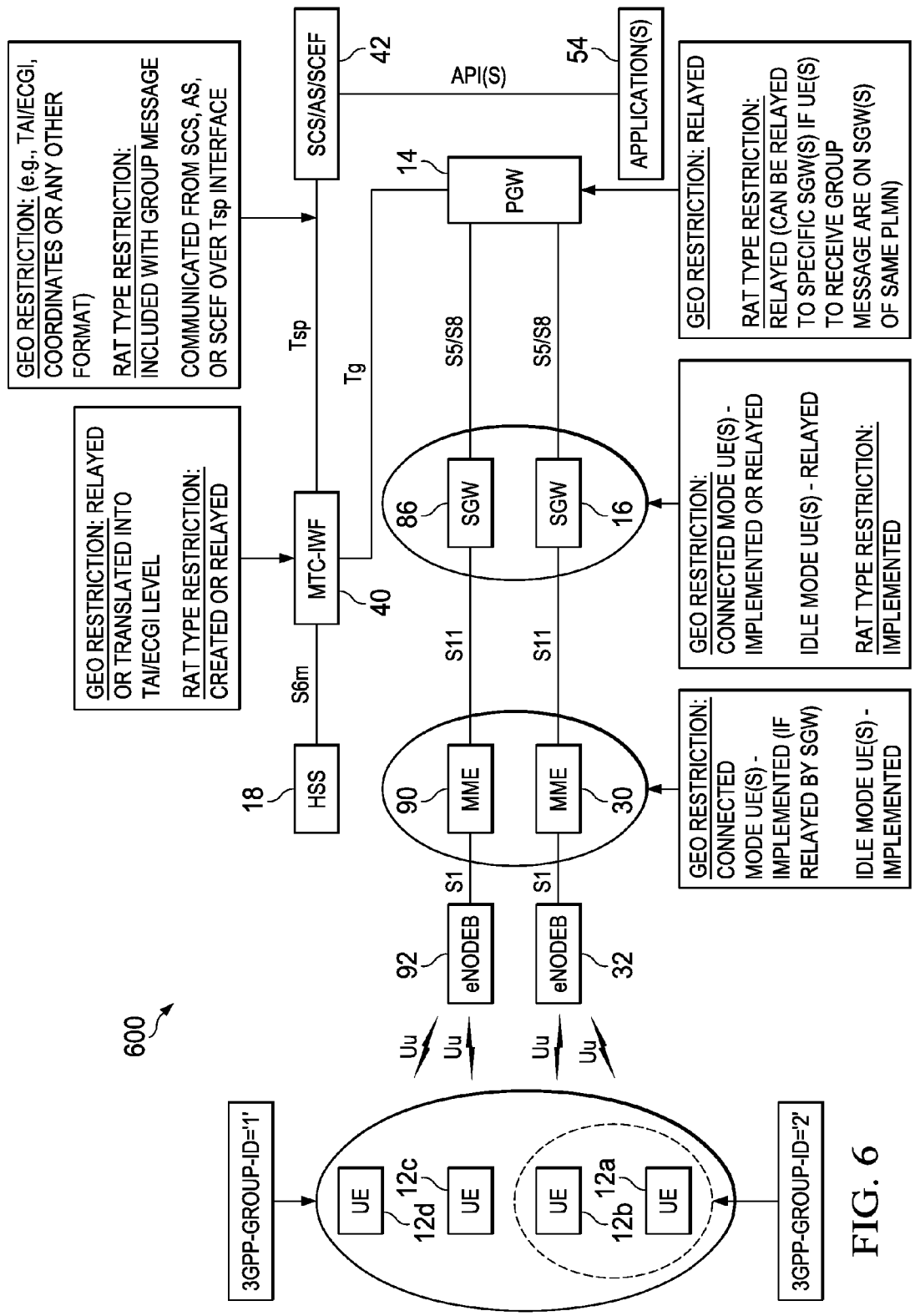
FIG. 6 is a simplified block diagram illustrating details associated with group message delivery and paging with a geolocation and/or Radio Access Technology (RAT) type restriction according to various embodiments of the present disclosure.

Turning to FIG. 6, FIG. 6 is a simplified block diagram 600 illustrating details associated with various options which can be used for group message delivery and paging with geolocation and/or RAT type restrictions according to various embodiments of the present disclosure. FIG. 6 illustrates UE 12*a*, PGW 14, SGW 16, HSS 18, MME 30, eNB 32, MTC-IWF 40, SCS/AS/SCEF 42 and application(s) 54. FIG. 6 also illustrates another SGW 86, another MME 90, another eNodeB 92 and additional UE 12*c*-12*d*. For the purposes of FIG. 6 it is assumed that UE 12*a*-12*d* each belong to a group identified by 3gpp-group-id='1' and are attached and have a PDN connection established to a group APN associated with 3gpp-group-id='1'. It is further assumed for purposes of FIG. 6 that UE 12*a*-12*b* belong to another group identified by 3gpp-group-id='2' and are attached and have a PDN connection established to a group APN associated with 3gpp-group-id='2'. Further it is assumed that SGWs 16, 86 belong to a same PLMN.

The various options shown in FIG. 6 relate to the various manners in which geo restriction and/or RAT type restriction information may be relayed or translated in communication system 10. Additionally, various options are illustrated for achieving geo and/or RAT type restrictions in delivering messages to each group. For example, beginning with SCS/AS/SCEF 42, geo restrictions (e.g., ECGI, TAI, coordinates or any other format) can be included in a message destined to either 3gpp-group-id='1', 3gpp-group-id='2' or both communicated over the Tsp interface to MTC-IWF 40. RAT type restrictions can also be included with the message.

If ECGI or TAI level geo restrictions are received, MTC-IWF 40 can relay the geo restrictions to corresponding PGW 14 identified by HSS 18. Note although only one PGW is shown in FIG. 6, it should be understood that communication system 10 can include multiple PGWs, which may serve UE belonging to a group. If coordinates or another format of geo restrictions are received, MTC-IWF 40 can translate them into ECGI or TAI level restrictions and then relay them to one or more appropriate PGWs. For example, if a geo restriction is for a particular city, say, for example, San Francisco, then MTC-IWF 40 may perform a mapping of the requested geo restriction to a TAI and/or ECGI level geo restriction. In various embodiments, MTC-IWF 40 can also perform mapping LAIs to one or more appropriate service area identifiers (SAIs), RAIs, RNC ID(s) and/or CGIs for GERAN/UTRAN use cases. In various embodiments, for SAI level geo restrictions, intra-RNC SAI changes may not be reported to SGSN 34. In various embodiments, Direct Tunnel (DT) can be disabled for UE, which belong to a group, using SGSN 34 when it recognizes 3gpp-group-id being sent by HSS 18 or a Home Location Register (HLR) for any APN associated with the group UE. In various embodiments, MTC-IWF 40 can also create RAT type restrictions based on geo restriction information received or based on explicit RAT type restrictions that may be received from SCS/AS/SCEF 42 or HSS 18. RAT type restrictions can also be relayed to one or more appropriate PGWs identified by HSS 18.

PGW 14 may relay geo restrictions to SGWs 16, 86. RAT type restrictions can also be relayed by PGW 14. Both geo location and RAT type restrictions can be carried as a GTP-U header along with the payload of a corresponding message. In various embodiments, RAT type restrictions can be relayed only to one or more specific SGWs of a same PLMN, which may serve one or more UEs to receive a group message. For example, for a group messages destined to users associated with 3gpp-group-id='2' (e.g., UE 12a-12b), PGW 14 may relay the group message only to SGW 16.

With regard to geo restrictions, SGWs 16, 86 can apply a RAT type restriction for one or both 3gpp-group-ids. SGWs 16, 86 can be configured in various manners to apply a geo restriction for CONNECTED mode UEs. For example, SGWs 16, 86 can apply a geo restriction by directly delivering the group message to the UEs by knowing the last known eNodeB ID through which corresponding UE of the group transitioned into CONNECTED mode (e.g., most significant 20 bits of ECGI represents eNodeB ID). This method is applicable if geo restriction is applicable at eNodeB ID levels. In various embodiments, RNC level geo restrictions may be handled for RNC ID(s) in a manner similar to those as described for eNodeB ID level geo restrictions. For ECGI level only or TAI level only geo restrictions, SGWs 16, 86 can apply such a restriction by requesting MMEs 30, 90, respectively, to provide the list of UEs in a given cell ID (ECGI) and then SGW 16, 86 can forwarding data to only those UEs in that cell. For IDLE mode UE, SGWs 16, 86 can relay the geo restriction to MMEs 30, 90, respectively, which can page the group UE only in those locations.

For the various options shown in FIG. 6, each SGW 16, 86 may either have an implicit 'group message expiration timer' configured on it or such a timer can be sent by SCS/AS/SCEF 42 or another application service/server to SGWs 16, 86 via MTC-IWF 40 (using appropriate interfaces). The timer can control how long after the receipt of a group message SGW 16, 86 may buffer the received group message for delivering the message to CONNECTED mode users (e.g., to account for IDLE mode UEs transitioning into CONNECTED mode via MME 30, 90 paging).

Figure 7:
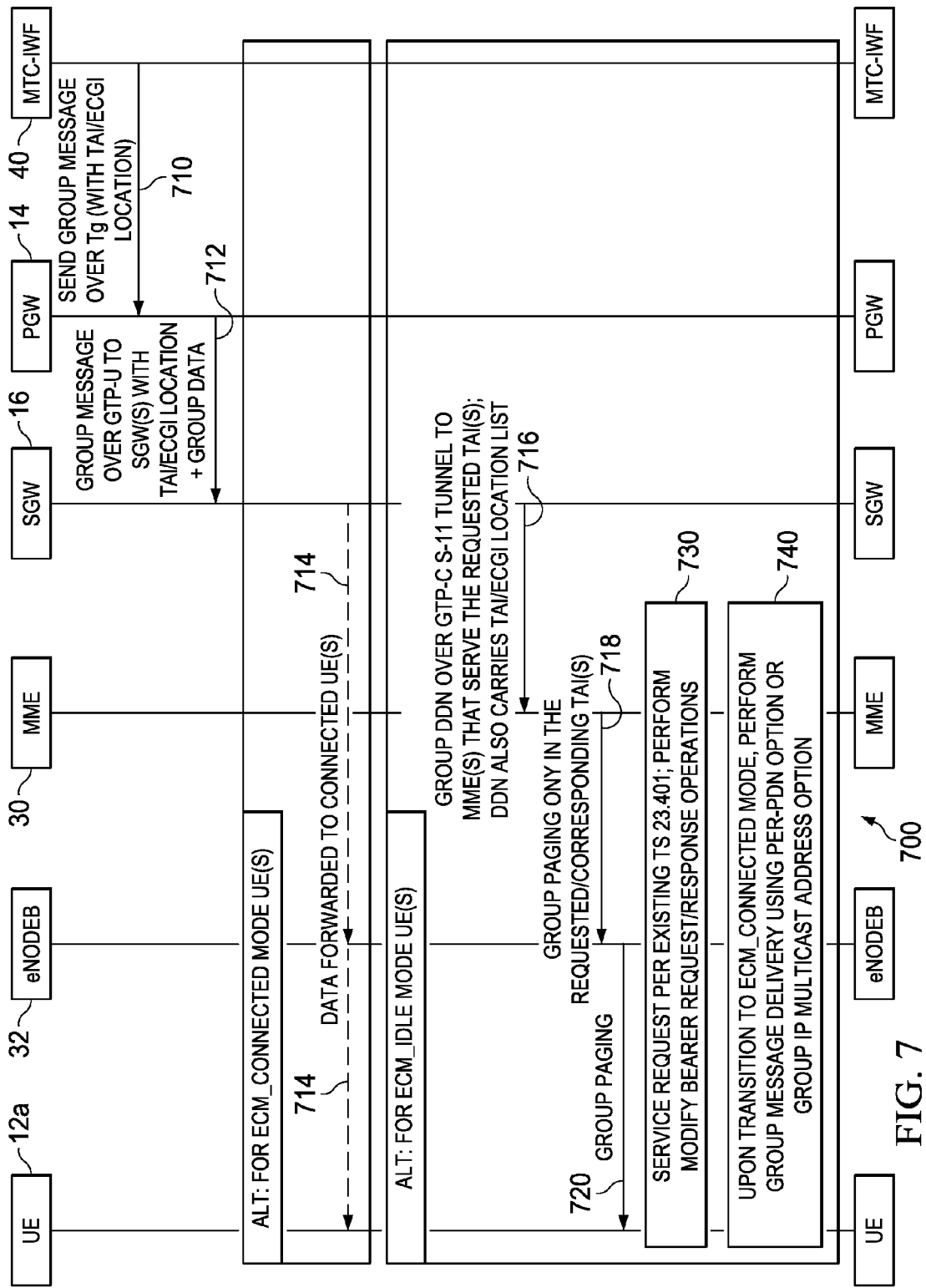
FIG. 7 is a simplified flow diagram illustrating example flows and activities associated with group message delivery and paging with a geolocation restriction according to one embodiment of the present disclosure.

Turning to FIG. 7, FIG. 7 is a simplified flow diagram 700 illustrating example flows and activities associated with group message delivery and paging with a geolocation restriction according to one embodiment of the present disclosure. FIG. 7 includes a given UE (e.g., UE 12a) to receive a group message, PGW 14, SGW 16, MME 30, eNodeB 32 and MTC-IWF 40. For FIG. 7, it is assumed that UE 12a belongs to a group identified by a given 3gpp-group-id and is attached and has a PDN connection established to a group APN associated with the 3gpp-group-id. The flows and activities illustrated in FIG. 7 may correspond to the first sub-option, described above for FIG. 1, in which SGW 16 may implement geo restrictions for CONNECTED mode UEs and MME 30 may implement geo restrictions for IDLE mode UEs.

Two example alternatives are shown in FIG. 7, for a first example alternative, it is assumed that UE 12a is an ECM_CONNECTED mode. For a second example alternative, it is assumed that UE 12a is in an ECM_IDLE mode. For the first sub-option, when MME 30 sends a Modify Bearer Request to SGW 16 in response to every IDLE to CONNECTED mode transition for UE of the group (which is in turn triggered by SERVICE REQUEST) it can includes the ULI of the UE (ECGI, TAI, eNBID, etc.) with an indication that this ULI is included because the UE is part of a group and not because PGW 14 has enabled ULI reporting. This indication is important because otherwise SGW 16 may unnecessarily forward the Modify Bearer Request to the PGW per existing behavior described in present 3GPP specifications.

For FIG. 7, it is assumed that MTC-IWF 40 has received a message destined to a group of users and has already performed authentication of the device sending the message, identified PGW 14 to receive the message, etc. Thus, the flows and activities shown in FIG. 7 may begin with MTC-IWF 40 communicating group message to PGW 14 over the Tg interface at 710. The message may include group data such as 3gpp-group-id, TAI, ECGI, etc. At 712, PGW 14 may send the group message over a group specific S5 GTP-U tunnel to all SGWs (e.g., SGW 16) to which is connected. This step can include the optimization of restricting sending the group message to one or more SGW(s) of only a PLMN of a single service provider if the TAI, ECGI list sent includes MCC/MNCs of only one particular operator.

For the first alternative example, assuming UE 12a is in an ECM_CONNECTED mode, SGW 16 may determine whether the ECGI for UE 12a matches the received geo restrictions whether any RAT type restrictions were received from PGW. Upon determining that UE 12a fits the criteria, SGW 16 can then deliver the message to the candidate UE at 714.

For the second alternative example, assuming UE 12a is in an ECM_IDLE mode, SGW 16 may send an S11 Group GTP-C tunnel DDN to all MMEs (e.g., MME 30) that serve the requested TAIs to page the IDLE mode UEs (e.g., UE 12a), as shown at 716. MME 30 may perform group paging only for particular requested locations (e.g., ECGI, TAI, etc.) for IDLE mode UEs. Thus, MME 30 may communicate a group page at 718 to eNodeB 32 serving UE 12a at the requested geolocations. At 720, eNodeB 32 may carry out Group Paging to UE 12a. Paged UE 12a can perform a Service Request at 730 per existing TS 23.401 procedures and subsequently can perform a Modify Bearer Request/Response with SGW 16. At 740, upon transition of UE 12a to ECM_CONNECTED mode, SGW 16 can, based on system configuration, perform group message delivery using either the per-PDN message delivery option or the IP multicast address message delivery option.

Turning to FIG. 8, FIG. 8 is a simplified flow diagram 800 illustrating other example flows and activities associated with group message delivery and paging with a geolocation restriction for an ECGI level only or TAI level only geo restriction according to one embodiment of the present disclosure. FIG. 8 includes a given UE (e.g., UE 12a) to receive a group message, SGW 16 and MME 30. Also shown in FIG. 8, eNodeB 32 and/or HeNB-GW 38 can be interchangeably used to provide various operational features. The flows and activities illustrated in FIG. 8 may correspond to the alternative solution for the first sub-option for group message delivery to ECM_CONNECTED mode UE for an ECGI level only or TAI level only geo restriction. For FIG. 8, it is assumed that UE 12a belongs to a group identified by a given 3gpp-group-id and is attached and has a PDN connection established to a group APN associated with the 3gpp-group-id.

For example, the flows and activities shown in FIG. 8 may be applicable when a group message needs to be delivered with a geo restriction applicable at an ECGI only level or a TAI only level, but not when the geo restriction is needed at an eNodeB level. In case the geo restriction is at an ECGI level only, a list of associated TAIs to those ECGI(s) may be provided. This may be done to account for a case where an HeNB-GW may be present on an S1-AP interface.

The flows and activities may begin at 810 where SGW 16 may receive a group message over a group tunnel with a given TAI level or ECGI level geo restriction. If SGW 16 receives group downlink data with an ECGI level only or TAI level only geo restriction, then it may not be able to immediately forward the data to the ECM_CONNECTED UEs of the group since it may not accurately know the latest TAI or ECGI where each UE is located. Thus, at 812, SGW 16 can send a new group specific S11 message (Request-UEs-In-TAI-ECGI-Report message) to MME 30 requesting the MME to report all the UEs in the given TAI or ECGI. If SGW 16 sends a DDN message to MME 30 for ECM_IDLE mode UEs, then the request to report UEs in a TAI or ECGI can be carried as in indication in the DDN message itself, rather than in a separate message.

For an ECGI level geo restriction, at 814, MME 30 can determine whether a requested ECGI is either from a directly connected eNodeB or an HeNB behind an HeNB-GW (e.g., HeNB 36 behind HeNB-GW 38). From this determination, MME 30 can send location reporting control only for UE(s) in directly connected eNodeB(s) (e.g., eNodeB 32). For a TAI level geo restriction, at 814, MME 30 can request location reporting control to the eNodeBs and/or HeNB-GW (e.g., eNodeB 32/HeNB-GW 38) that supports the TAI.

For UEs directly connected to an eNodeB, at 816, MME 30 can activate one time Location Reporting procedure (e.g., Location Reporting Control with Request Type set as Direct reporting) for all the UEs belonging to the group only towards the eNodeB (e.g., eNodeB 32) that owns the ECGI (MSB 20 bits of ECGI is the eNodeB ID) or the TAI. If the MSB 20 bits of the ECGI does not map to any eNodeB that the MME is connected, then this could mean that the requested ECGI is an ECGI of a HeNB (e.g., HeNB 36) behind a HeNB-GW (e.g, HeNB-GW 38). For such cases, MME 30 can look-up all the UEs that are in this ECGI and may not need to activate any location reporting for such UEs.

At 818, eNodeB 32 can send the Location Report for each UE (e.g., UE 12a). Once the E-UTRAN returns the Location Report for all the UEs, MME 30 can send a single S11 message to SGW 16 at 820 for the group with the S11 SGW TEIDs of all the UEs in the requested TAI or ECGI. At 820, SGW can start forwarding the downlink data over S1-U for reported UE 12a using either the per-PDN message delivery option or the IP multicast address delivery option and eNodeB 32 can communicate the downlink data to UE 12a.

Figure 9A:
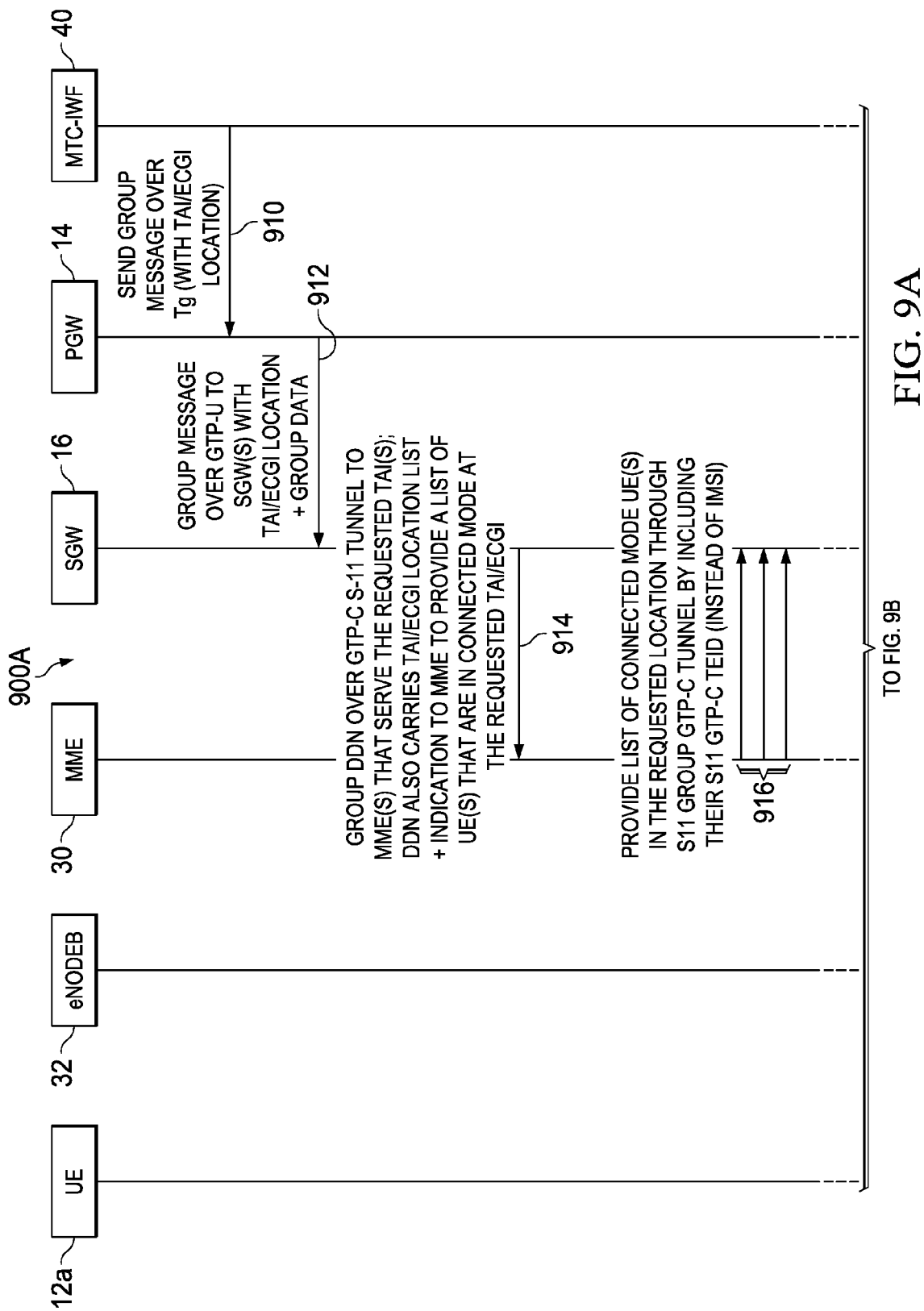
FIGS. 9A-9B are simplified flow diagrams illustrating yet other example flows and activities associated with group message delivery and paging with geolocation and/or RAT type restriction according to one embodiment of the present disclosure.
Figure 9B:
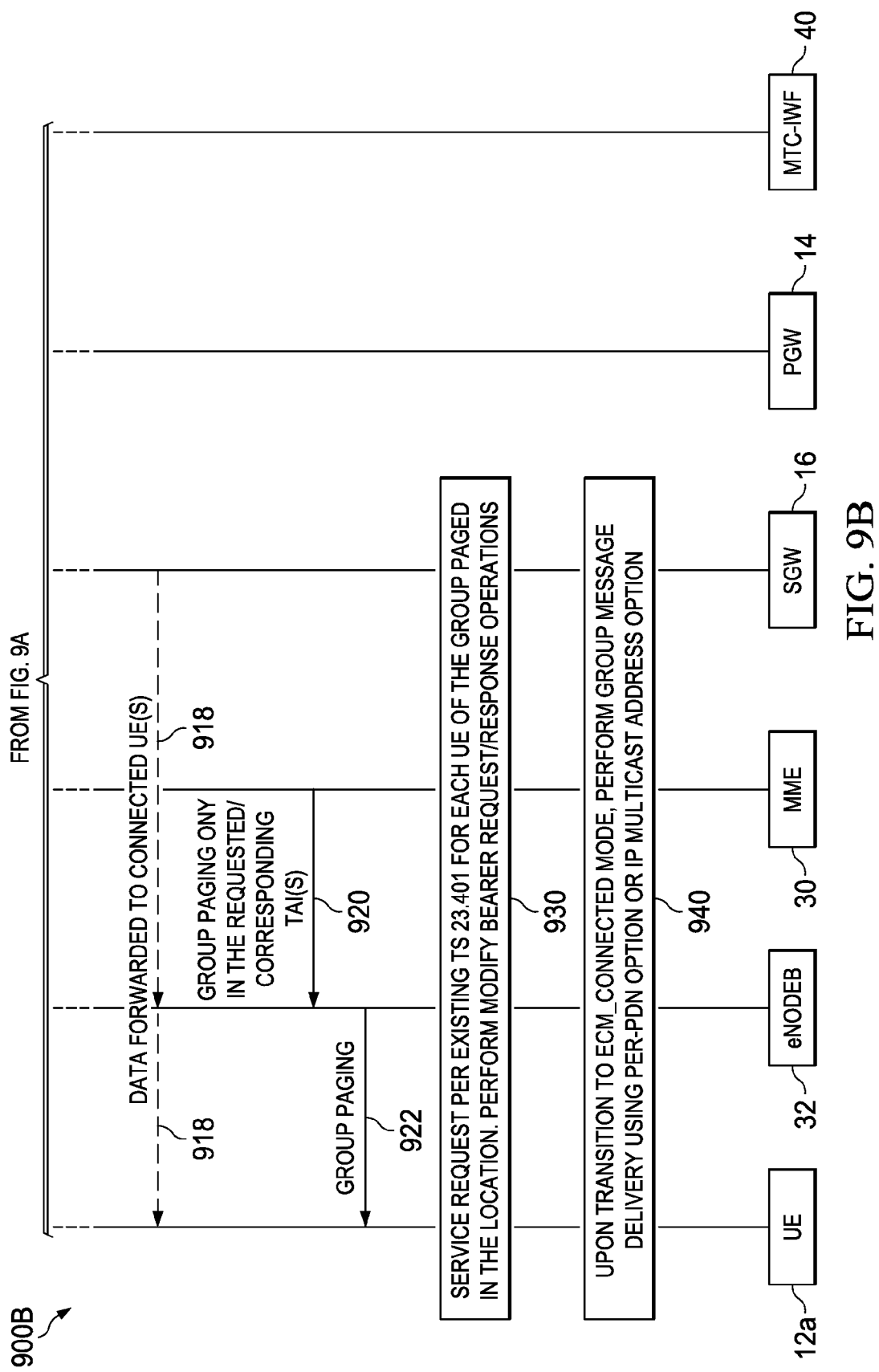

Turning to FIGS. 9A-9B, FIGS. 9A-9B are simplified flow diagrams 900A-900B illustrating other example flows and activities associated with group message delivery and paging with a geolocation and/or RAT type restriction according to one embodiment of the present disclosure. FIGS. 9A-9B include a given UE (e.g., UE 12a) to receive a group message, PGW 14, SGW 16, MME 30, eNodeB 32 and MTC-IWF 40. The flows and activities illustrated in FIGS. 9A-9B may correspond to the second sub-option, described above, where MME 30 may implement restrictions for both CONNECTED and IDLE mode UE. For FIG. 9, it is assumed that UE 12a belongs to a group identified by a given 3gpp-group-id and is attached and has a PDN connection established to a group APN associated with the 3gpp-group-id.

For FIG. 9, it is assumed that MTC-IWF 40 has received a message destined to a group of users and has already performed authentication of the device sending the message, identified PGW 14 to receive the message, etc. Thus, the flows and activities shown in FIG. 9 may begin with MTC-IWF 40 communicating group message to PGW 14 over the Tg interface at 910. The message may include group data such as 3gpp-group-id, TAI, ECGI, etc. At 912, PGW 14 may send the group message over a group specific S5 GTP-U tunnel to all SGWs (e.g., SGW 16) to which is connected. This step can include the optimization of restricting sending the group message to one or more SGW(s) of only a PLMN of a single service provider if the TAI, ECGI list sent includes MCC/MNCs of only one particular operator.

At 914, SGW 16 may send an S11 Group GTP-C tunnel DDN to all MMEs (e.g., MME 30) that serve the requested TAIs to page the IDLE mode UEs. In this DDN, SGW 16 can also request MME 30 to indicate to SGW 16 a list of UEs that are in CONNECTED state at the requested TAI, ECGI list areas.

At 916, MME 30 may send a unidirectional S11 indication (no ACKs) to SGW 16 including the S11 SGW GTP-C TEIDs of the CONNECTED mode UEs. Note that instead of IMSI, including GTP-C TEID can minimize message size since TEID is typically 4 bytes but IMSI in TBCD encoding typically takes 8 bytes. MME may choose to send multiple such indications, for example, to allow for distributed architecture. For example in a distributed architecture each session manager may send one indication including a list of UEs in CONNECTED mode in that corresponding session manager. The flows and activities may continue to flow diagram 900B as shown in FIG. 9B.

At 918, SGW 16, upon receiving these indications, can start forwarding the data to connected mode UEs; for example, forwarding the data to UE 12a if UE 12a is in a CONNECTED mode. At 920, MME 30, in parallel, can perform Group Paging only in the locations requested (TAI) for IDLE mode UEs; for example, performing Group Paging for UE 12a if UE 12a is in an IDLE mode. At 922, eNodeB 32 can page corresponding UE 12a. At 930, paged UE 12a can perform a Service Request per TS 23.401 and subsequently can perform Modify Bearer Request/Response operations with SGW 16. At 940, upon transition of UE 12a to ECM_CONNECTED mode, SGW 16 can, based on system configuration, perform group message delivery using either the per-PDN message delivery option or the IP multicast address message delivery option.

Figure 10:
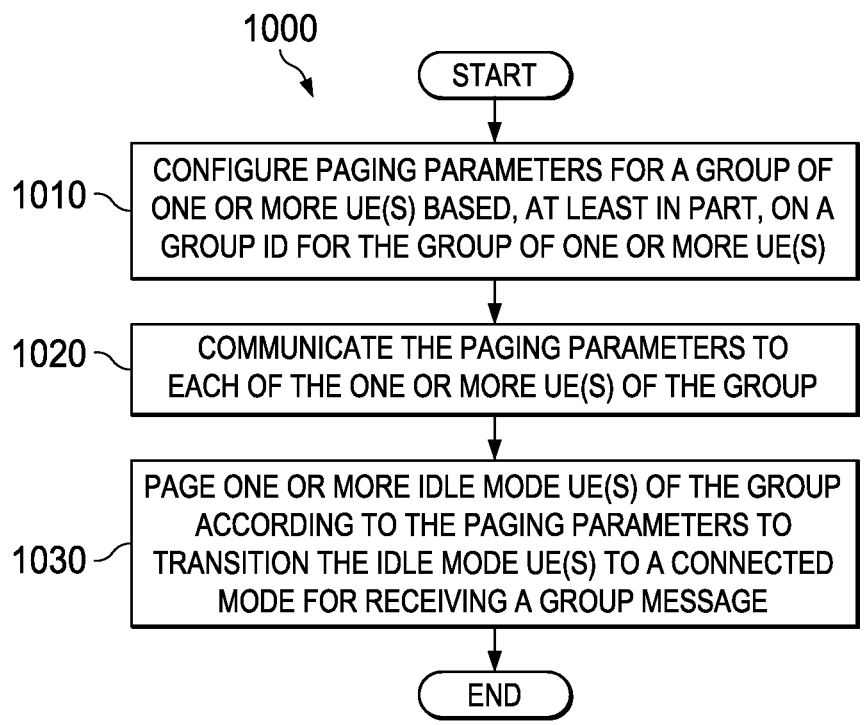
FIGS. 10-11 are simplified flow diagrams illustrating example operations associated with providing group paging according to various embodiments of the present disclosure.

Turning to FIG. 10, FIG. 10 is a simplified flow diagram illustrating example operations associated with providing group paging according to one embodiment of the present disclosure. In various embodiments, the operations may be perform by components within communication system 10 including UE 12a-12b, MME 30 and eNodeB 32. As discussed herein, eNodeB 32 may configure paging parameters for UE 12a-12b belonging to a group. Thus processing may start at 1010 when eNodeB 32 may configure paging parameters for a group of one or more UE (e.g., UE 12a-12b) belonging to a group based, at least in part, on a group ID (e.g., 3gpp-group-id) for the group of one or more UE.

At 1020, eNodeB 32 may communicate the paging parameters to each of the one or more UE of the group. In various embodiments, communicating the paging parameters can include communicating the paging parameters during connection of each of the one or more UE to a group APN or communicating the paging parameters to each of the one or more UE through an SIB.

At 1030, eNodeB 32 may page one or more IDLE mode UE of the group according to the paging parameters to transition the IDLE mode UE to a CONNECTED mode for receiving a group message. According to the various embodiments described herein in this Specification, MME 30 may initiate paging for the IDLE mode UE using the 3gpp-group-id.

Figure 11:
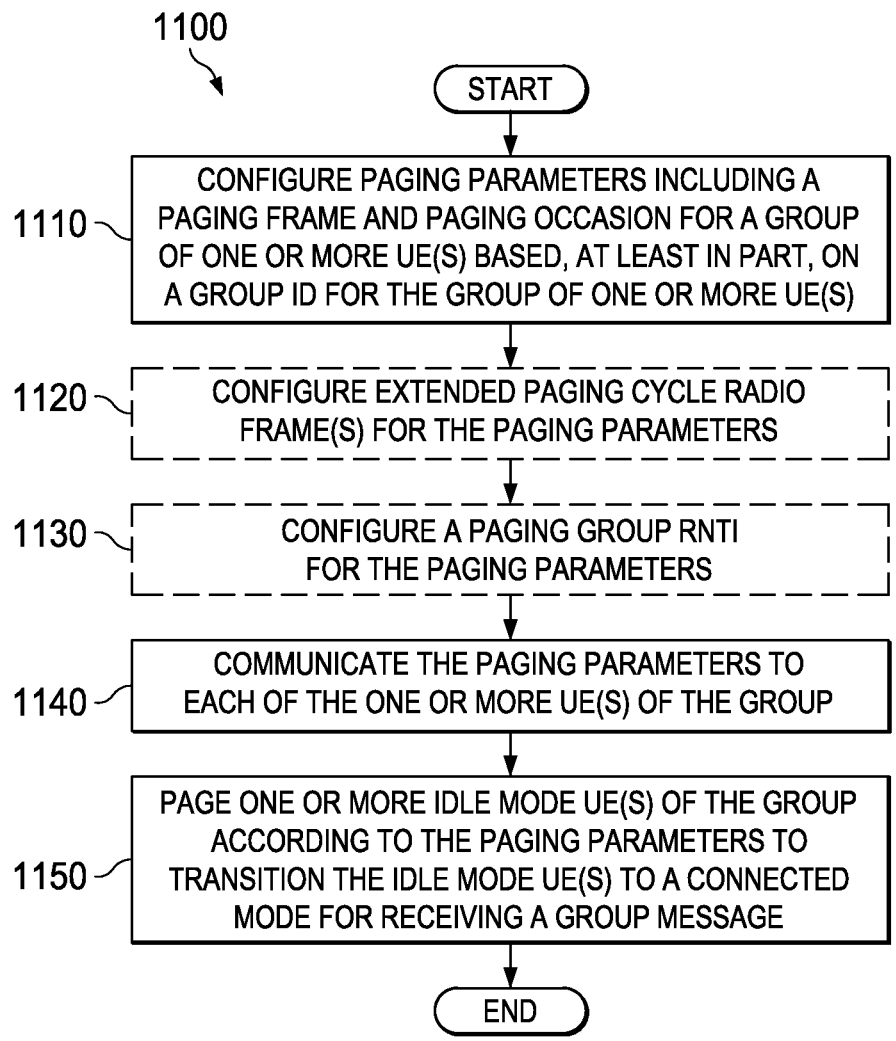

Turning to FIG. 11, FIG. 11 is a simplified flow diagram illustrating other example operations associated with providing group paging according to one embodiment of the present disclosure. In various embodiments, the operations may be perform by components within communication system 10 including UE 12a-12b, MME 30 and eNodeB 32. As discussed herein, eNodeB 32 may configure paging parameters for UE 12a-12b belonging to a group. Thus processing may start at 1110 when eNodeB 32 may configure paging parameters including a Paging Frame and Paging Occasion for a group of one or more UE (e.g., UE 12a-12b) belonging to a group based, at least in part, on a group ID (e.g., 3gpp-group-id) for the group of one or more UE.

In various embodiments, as shown at 1120, eNodeB 32 may also configure one or more Extended Paging Cycle radio frame(s) for the paging parameters. In various embodiments, the Extended Paging Cycle radio frames may be extended to 512, 1024 or 2048 radio frames. In various embodiments, as shown at 1130, eNodeB 32 may also configure a Paging Group RNTI (e.g., P-G-RNTI) for the paging parameters.

At 1140, eNodeB 32 may communicate the paging parameters to each of the one or more UE of the group. At 1150, eNodeB 32 may page one or more IDLE mode UE of the group according to the paging parameters to transition the IDLE mode UE to a CONNECTED MODE for receiving a group message. According to the various embodiments described herein in this Specification, MME 30 may initiate paging for the IDLE mode UE using the 3gpp-group-id.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network flows, and signaling protocols, communication system 10 may be applicable to other exchanges, routing protocols, or routed protocols to provide for group messaging and paging in a network. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
configuring paging parameters for a group of two or more user equipment (UE) based, at least in part, on a group identifier (ID) for the group of two or more UE;
communicating the paging parameters to each of the two or more UE of the group;
communicating a message from a Mobility Management Entity (MME) to a serving gateway (SGW) that identifies a largest remaining time for a Tracking Area Update (TAU) timer among all of the two or more UE of the group that are in a Power Savings Mode (PSM);
buffering a group message that is to be delivered to each of the two or more UE of the group in the PSM according to the identified largest remaining time; and
paging any idle mode UE of the group in the PSM according to the paging parameters at expiration of the largest remaining time to transition the idle UE to a connected mode to receive the group message.

2. The method of claim 1, wherein configuring the paging parameters includes configuring a paging frame and a paging occasion for the group of two or more UE based on the group ID.

3. The method of claim 1, wherein configuring the paging parameters includes configuring extended paging cycle radio frames for the group of two or more UE.

4. The method of claim 3, wherein the extended paging cycle radio frames include at least one of: 512 radio frames; 1024 radio frames; and 2048 radio frames.

5. The method of claim 1, wherein configuring the paging parameters includes configuring a paging group Radio Network Temporary Identifier (RNTI) for the group of two or more UE.

6. The method of claim 5, wherein paging the idle mode UE of the group includes providing the paging group RNTI on a Physical Downlink Control Channel (PDCCH).

7. The method of claim 1, wherein communicating the paging parameters to each of the two or more UE of the group includes communicating the paging parameters during connection of each of the two or more UE to a group access point name (APN).

8. The method of claim 1, wherein communicating the paging parameters to each of the two or more UE of the group includes communicating the paging parameters using a System Information Broadcast (SIB) communicated by an eNodeB.

9. One or more non-transitory tangible media encoding logic that include instructions for execution by a processor, wherein the execution causes the processor to perform operations, comprising:
 configuring paging parameters for a group of two or more user equipment (UE) based, at least in part, on a group identifier (ID) for the group of two or more UE;
 communicating the paging parameters to each of the two or more UE of the group;
 communicating a message from a Mobility Management Entity (MME) to a serving gateway (SGW) that identifies a largest remaining time for a Tracking Area Update (TAU) timer among all of the two or more UE of the group that are in a Power Savings Mode (PSM);
 buffering a group message that is to be delivered to each of the two or more UE of the group in the PSM according to the identified largest remaining time; and
 paging any idle mode UE of the group in the PSM according to the paging parameters at expiration of the largest remaining time to transition the idle UE to a connected mode to receive the group message.

10. The media of claim 9, wherein configuring the paging parameters includes configuring a paging frame and a paging occasion for the group of two or more UE based on the group ID.

11. The media of claim 9, wherein configuring the paging parameters includes configuring extended paging cycle radio frames for the group of two or more UE.

12. The media of claim 11, wherein the extended paging cycle radio frames include at least one of: 512 radio frames; 1024 radio frames; and 2048 radio frames.

13. The media of claim 9, wherein configuring the paging parameters includes configuring a paging group Radio Network Temporary Identifier (RNTI) for the group of two or more UE.

14. The media of claim 13, wherein paging the idle mode UE of the group includes providing the paging group RNTI on a Physical Downlink Control Channel (PDCCH).

15. The media of claim 9, wherein communicating the paging parameters to each of the two or more UE of the group includes communicating the paging parameters during connection of each of the two or more UE to a group access point name (APN).

16. The media of claim 9, wherein communicating the paging parameters to each of the two or more UE of the group includes communicating the paging parameters using a System Information Broadcast (SIB) communicated by an eNodeB.

17. A system, comprising:
 a memory element for storing data; and
 a processor for executing instructions associated with the data, wherein wherein the executing causes the system to perform operations comprising:
  configuring paging parameters for a group of two or more user equipment (UE) based, at least in part, on a group identifier (ID) for the group of two or more UE;
  communicating the paging parameters to each of the two or more UE of the group;
  communicating a message from a Mobility Management Entity (MME) to a serving gateway (SGW) that identifies a largest remaining time for a Tracking Area Update (TAU) timer among all of the two or more UE of the group that are in a Power Savings Mode (PSM);
  buffering a group message that is to be delivered to each of the two or more UE of the group in the PSM according to the identified largest remaining time; and
  paging any idle mode UE of the group in the PSM according to the paging parameters at expiration of the largest remaining time to transition the idle UE to a connected mode to receive the group message.

18. The system of claim 17, wherein configuring the paging parameters includes configuring a paging frame and a paging occasion for the group of two or more UE based on the group ID.

19. The system of claim 17, wherein configuring the paging parameters includes configuring a paging group Radio Network Temporary Identifier (RNTI) for the group of two or more UE.

* * * * *